United States Patent [19]

Aires et al.

[11] Patent Number: 4,649,385

[45] Date of Patent: Mar. 10, 1987

[54] ELECTRONIC LOCATING SYSTEM FOR PERSONS RECEIVING TELEPHONE CALLS

[75] Inventors: Ramon H. Aires, Granada Hills; Charles A. Clark, Jr., Chatsworth; Roy A. Ito, Woodland Hills, all of Calif.; Kenneth R. Hackett, Boulder, Colo.

[73] Assignee: Teloc R & D Ltd., Broomfield, Colo.

[21] Appl. No.: 517,321

[22] Filed: Jul. 26, 1983

Related U.S. Application Data

[63] Continuation-in-part of Ser. No. 407,883, Aug. 13, 1982, abandoned.

[51] Int. Cl.$^4$ .................................................. H04Q 7/00
[52] U.S. Cl. ...................................... 379/57; 455/613; 367/199; 340/825.49; 379/210
[58] Field of Search .............. 340/825.44, 825.49, 340/311.1; 455/254, 115, 16, 38, 613; 343/12 R, 6.5 R, 6.5 SS; 367/6, 199; 179/2 EB, 2 EC

[56] References Cited

U.S. PATENT DOCUMENTS

| | | | |
|---|---|---|---|
| 3,657,715 | 4/1972 | Curtin | 367/197 |
| 3,696,384 | 10/1972 | Lester | 367/199 |
| 3,739,327 | 6/1973 | Lester | 340/825.49 |
| 3,805,227 | 4/1974 | Lester | 367/6 |
| 3,805,265 | 4/1974 | Lester | 340/825.49 |
| 4,275,385 | 6/1981 | White | 340/825.49 |
| 4,378,551 | 3/1983 | Drapac | 340/311.1 |
| 4,392,135 | 7/1983 | Ohyagi | 340/825.44 |
| 4,545,071 | 10/1985 | Freeburg | 455/38 |

Primary Examiner—Donald J. Yusko
Attorney, Agent, or Firm—Charles E. Pfund

[57] ABSTRACT

A method and system is disclosed for determining the location of a member of a class of individual transmitter-receiver units distributed throughout a defined facility. A central station establishes a two-way communication channel with one or more relay stations and sends a coded message identifying a particular individual unit over the communication channel. The relay stations respond to the message by sending out wake-up signals and radiant energy inquiry signals. The individual unit identified in the inquiry signal responds with a radiant energy acknowledgment signal. Embodiments of the invention disclose the use of infrared energy or ultrasonic energy for the radiant energy. Ultrasonic signals are sent on a plurality of frequencies. The relay stations send identification signals to the central station which identify the sending relay station and indicate whether an acknowledgment signal was received. The central station determines the approximate location of the individual unit from the identification signals.

According to one feature of the invention, the relay stations are divided into groups in which each relay station of a group covers an area distinct from the areas covered by the remaining relay stations of the same group. In this arrangement the central station can communicate with one group of relay stations at a time.

33 Claims, 32 Drawing Figures

BADGE INFRARED TRANSMITTER

BADGE ULTRASONIC TRANSMITTER

ELECTRONIC LOCATING SYSTEM FOR PERSONS RECEIVING TELEPHONE CALLS

BACKGROUND OF THE INVENTION

This is a continuation-in-part of the pending U.S. patent application Ser. No. 407,883, filed Aug. 13, 1982, now abandoned.

This invention relates to a system with the ability to locate a transmitter-receiver unit (Badge) worn by a person while in a particular facility such as a hospital, an airport, a department store, a large legal office, a manufacturing complex and/or many other business or service organizations. More particularly, the system is able to determine the number of the most appropriate telephone to which to route a call for the person wearing the Badge that has been located.

Of the locating systems actually in use today, a paging system utilizing a microphone and many loudspeakers is the most frequently encountered. In this system a voice usually requests the desired person to call a telephone number or the operator so an incoming call or a call from within the facility can be connected to the nearest appropriate phone to the person being called. This type of paging system tends to cause annoyance to many others not involved with the call. In addition, such a loudspeaker paging system is usually slow.

A number of other "silent" paging systems have been devised which use lights and/or symbols to indicate that there is a telephone message for one of a very limited number of people. Alternatively, radio paging systems are available which alert a specific person to come to a telephone, but the radio receivers and central transmitting facilities are usually quite expensive. An elaborate intercom system is sometimes used to avoid bothering everyone in the facility by selecting only one speaker in a particular room to page a person for whom a telephone call is waiting. Such a system has no way of knowing whether or not the desired person will hear the message. None of these prior systems have a locating ability or the ability to automatically connect the call to the most appropriate telephone without talking to one or more persons.

An ultrasonic locating system has been disclosed by Lester in U.S. Pat. No. 3,696,384. The Lester system provides one transceiver in each room to search all rooms for a particular pocket unit. The location of the pocket unit is determined to be the room containing the transceiver which receives a response from the pocket unit. However, if more than one transceiver receives the response from the pocket unit, Lester makes no provision for identifying the room containing the pocket unit. Transceivers may pick up signals from other rooms when the doors to the rooms are not completely closed.

Lester uses ultrasonic signals to and from the badges. Thus, his system is slower than one which uses energy, such as infrared, which travels at the speed of light as opposed to the speed of sound. Speed is important in a large system which must handle the placing of many calls in a short time span. The use of ultrasonics also must contend with the problem of the Doppler frequency shift caused by movement of the pocket transceiver unit, for example, when the carrier of the pocket unit is walking. It is possible that the frequency of the transmitted signal from the unit may be shifted outside the bandwidth of the receiver, especially when the receiver has a narrow bandwidth as is the case with using piezoelectric crystals as transceiver's as disclosed by Lester.

SUMMARY OF THE INVENTION

This system is directed to a method and system for locating a member of a large population of individual units within a defined facility. The units could be transmitter-receiver badges carried by people or the units could be located in items such as automobiles whose location is desired. The facility may be an office, a building, a garage or a number of buildings.

According to the present invention, a central station receives requests to establish the location of one of the units. Relay stations are located about the facility in such a manner as to be able to cover the facility with radiant energy. A two-way communication channel is established between the central station and one or more of the relay stations and the central station sends out a coded message identifying the searched for unit. The one or more relay stations transmit an inquiry signal in response to the coded message. If the individual unit identified in the coded message receives the inquiry signal, it will transmit an acknowledgment signal. The relay stations which receive the acknowledgment signal will send identification signals to the central station identifying the respective relay stations. The central station determines the location of the unit from the identity of the relay station or stations which are within range of the unit to receive the acknowledgment signal and thus provided the central station with identification signals.

According to an embodiment of the system of the present invention, there are three elements including a Control Console, a plurality of Relay Stations, and a plurality of Badges. The Control Console acts as the central station and the Badges act as the units. The system of the present invention has distributed intelligence, that is, there is a microprocessor or microcomputer in each element of the system. Each element of the system is capable of performing fairly complex functions on command. This system approach reduces the amount of communication between units to a minimum to perform a specific function. An additional advantage of the distributed intelligence approach is the ability to modify the characteristics of the system to optimize for various modes of operation.

The Control Console is in control of all other elements of the system. In an embodiment of the system of the present invention which uses a manual telephone switchboard, a cathode ray tube or television type display monitor and a keyboard are used to interface with the operator. The operator will insert via the keyboard a person's name or assigned telephone number when a call for him or her arrives at the switchboard. The Control Console microprocessor will automatically search a memory for information that would indicate the most likely location of the person being called at that time. Such information was previously stored in memory based on daily patterns or, if desired, by the fact that the person to be located answered or placed a call at a specific phone within the last few minutes. The Control Console will then address a relay station in the "most likely" area and request a broadcast of an inquiry signal containing the Badge number of the person to be located.

If the Control Console does not find a most likely place for locating the call recipient, such as would be the case when the person being located is a visitor on the premises, or it has initiated a direct call to the normal location of the named individual and no response is received, the Control Console determines that an all-points search is required.

The Badge will respond to the inquiry signal if it is within range of the Relay Station. When the Relay Station receives the responses from the Badge it sends its own (Relay) identification and an indication that a positive response was obtained from the desired Badge. Upon receipt of a positive response the Control Console looks in its memory for an appropriate telephone nearest to the responding Relay Station and displays the number of that telephone to the operator. When the Badge responds it will also alert the person wearing the badge with a "chime" or other suitable alert that there is a call for him or her about to be placed on the nearest appropriate phone.

The nearest appropriate phone will depend upon the type of office or facility. In some places, it will actually be the nearest phone. In other facilities, it will be an appropriately marked "Red", "Blue", "White", or otherwise identified "appropriate" phone for the purpose. In certain areas, such as a hospital, it may be appropriate for the person being called to walk to a phone and dial a specific number. All of these conditions can be handled by placing the corresponding instructions into the Control Console master program. In all of the above situations, the telephone number required to reach the person being called will appear on the display so that the operator can complete the call.

In an alternative embodiment of the system of the present invention an automatic switchboard system is used. Here, the assigned number of the person being called will be intercepted by the locating system. The Control Console will proceed as in the description of the manual system to determine the number of the telephone most appropriate to complete the call in the minimum time. This number will be transmitted to the switchboard for completion of the connection.

The system of the present invention derives an advantage from using infrared radiation. Infrared radiation travels at the speed of light which is much quicker than the speed of sound. This enables the system to be used to handle heavy traffic.

In the present system, when ultrasonic energy is used, transmission of signals is made at two frequencies. This avoids the problem of nulls created by multipath. Also the bandwidth of the transceivers used in the present invention is made wide enough to accommodate Doppler frequency shift corresponding to Badge speeds of up to seventeen miles per hour relative to the relay station.

The method and system of the present invention has the advantages of being able to function in a very large room. Several relay stations may be placed in the same room. When more than one of the relay stations is within the range of the individual unit being searched for, a search can be repeated. In the repeated search, the power of the relay station transmitters can be reduced or alternatively the sensitivity of the relay stations receivers can be lowered. In this manner, the location of a badge within a large room can be narrowed to the nearest relay station. The relay stations with overlapping coverage belong to different groups so that they will communicate with the Control Console at different times thereby avoiding interference. It is also possible under the present invention to use ultrasonic energy in the acknowledgment signal transmitted by the badge and to measure the time between the inquiry signal and the acknowledgment signal. When the Control Console receives the time information it can determine which relay station is nearest the badge.

According to a still further advantage of the present invention, the badge has a processor means so that it can understand commands sent out by the relay station. For instance, the relay station when sending an inquiry signal can command the badge to chime or not to chime.

Other objects and advantages of the invention will become apparent during the following description of the presently preferred embodiment of the invention taken in conjunction with the drawings.

DESCRIPTION OF THE PREFERRED EMBODIMENTS

System Description

Figure 1:
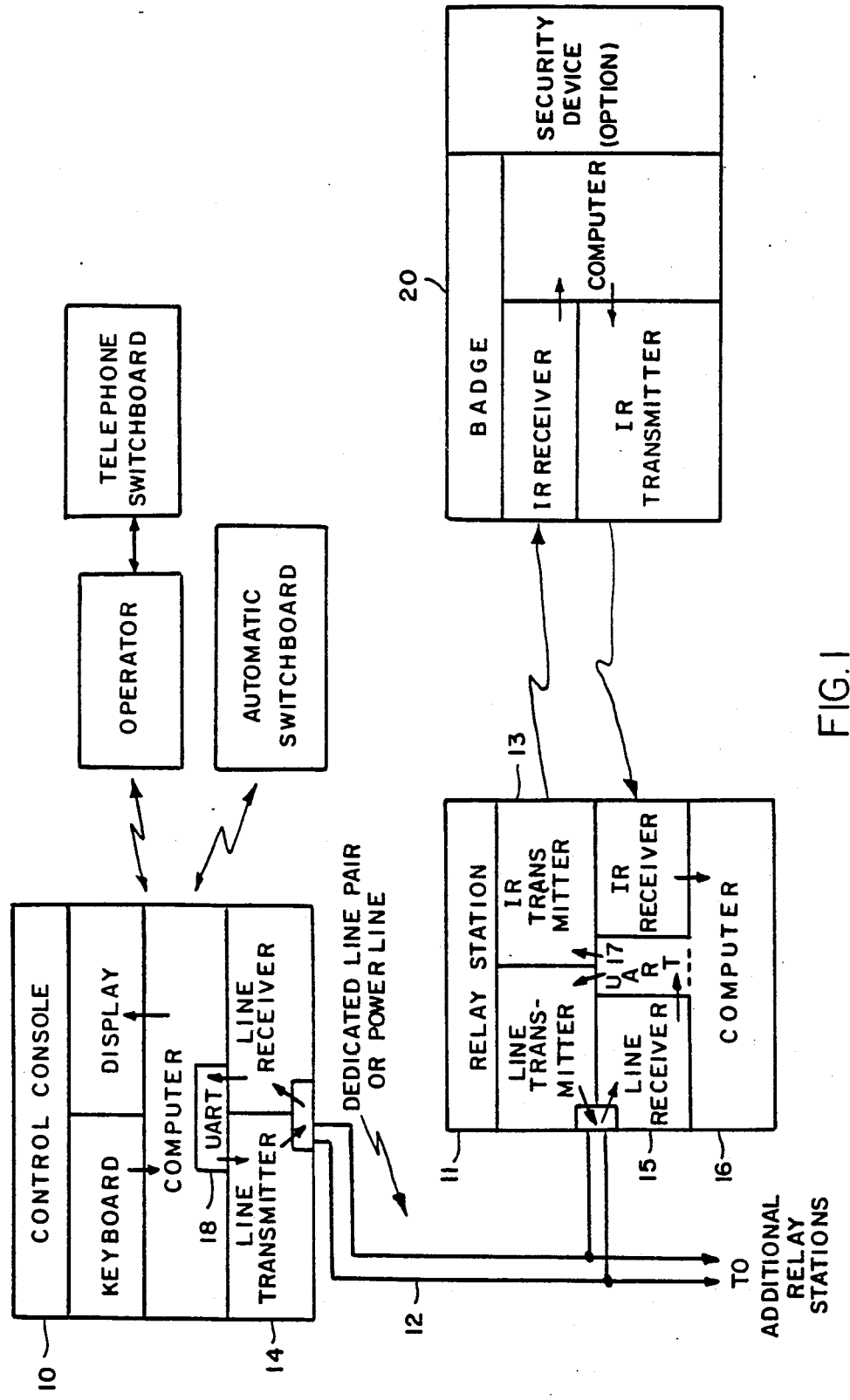
FIG. 1 is a block diagram of an overall telephone locating system.

The system of the present invention includes a Control Console 10, a plurality of Relay Stations 11 and a plurality of Badge Units 20 shown in the block diagram in FIG. 1. The Control Console 10 operates as a central station. A low power frequency modulated transmitter 14 is included in the Control Console to forward commands and interrogations to the Relay Stations 11. Each Relay Station contains a receiver 15 sensitive to the frequency modulated signals transmitted by the Control Console transmitter 14. One means of coupling the signals from the Control Console transmitter 14 to the Relay Stations receivers 15 is by carrier current via the power lines 12. An alternate means is via a dedicated pair of wires such as is commonly used with telephone or paging equipment. A preferred center frequency of the frequency modulated (FM) carrier transmitted by the Control Console transmitter 14 is 474,048 Hz. When more than one locating system is operated on power lines connected to the same power transformer or on said dedicated pair of wires, additional center frequencies for the FM carriers to be used by the additional systems are required. The carrier is frequency modulated by a subcarrier frequency, preferably 9876 Hz, when data from the Control Console representing a binary "one" is present. The carrier frequency is not frequency modulated when a binary "zero" is present in the data from the Control Console.

The receiver 15 in the Relay Station amplifies and detects the FM transmission coupled to it by the power lines or other suitable pair of wires from the Control Console to obtain the subcarrier. The subcarrier is then amplified and detected to obtain "ones" and "zeros" from which data can be extracted by a microcomputer 16 in the Relay Station. The presently preferred microcomputer is an Intel 8051. The data is sent between the Control Console and the Relay Station in a message format commonly used in communication systems using a Universal Asynchronous Receiver Transmitter (UART) 17, 18 in both the transmitting and receiving portions of the two-way communication channel. In the Relay Station the UART 17 is contained within the microcomputer 16. Therefore, the data output from the receiver 15 is connected directly to the UART input port of the microcomputer 16. The instructions contained within the Read Only Memory (ROM) in the microcomputer 16 will enable it to decode the message and take appropriate action.

The Relay Stations are located within the facility so as to be cumulatively capable of substantially covering the facility with radiant energy. The presently preferred radiant energy is infrared. In a preferred embodiment of the present invention, Relay Stations are identified as belonging to a particular group such as A, B, C, or D. In order to have the Relay Stations cover the facility with a minimum of blind spots, there will be some overlap of coverage by two or more Relay Stations in some areas. The maximum number of Relay Stations covering an overlapped area can be held to four. The Relay Stations are assigned to one of these four groups in such a way that the overlapped area will be always covered by the Relay Stations belonging to different groups. No two Relay Stations covering the same area will be assigned to the same group. In other words, each of the Relay Stations of a particular group covers an area which is distinct from the areas covered by each of the other Relay Stations in the same group. This will eliminate the possibility of interference from two or more Relay Stations transmitting at the same time within the same area.

In addition to a group number, each Relay Station is also given a location code. The group number and the location code will be hard wired via wire links, set in by multiple DIP switches, or wired into a code plug that stays at the Relay Station location even if the unit is replaced with a substitute. When the Control Console transmits a coded message to a Relay Station, the coded message contains an address field. The address will either be a group number identifying a particular group of Relay Stations or a location code identifying a particular Relay Station. Each Relay Station compares the transmitted address with its own group number and location code. If there is no match of the group of number of location code, the Relay Station microcomputer 16 ignores the remainder of the message. If either group or location numbers match, the microcomputer 16 stores the Badge identification number and additional instructions in its Random Access Memory (RAM) as it is received from the Control Console.

The relay station microcomputer initiates transmission to search for the badge via an infrared (IR) transmitter 13. The search is begun by sending out a wake up signal which when received by the badge powers up its circuits from the normal quiescent low current condition which is maintained to conserve battery power. This feature is necessary if long battery life is desired since the badge receiver must be powered for reception at all times. Since the relay stations of different groups can have overlapping coverage the transmission of a wake up signal from more than one group of relay stations is avoided to prevent interference. According to one embodiment of the invention the control console instructs the relay stations to transmit a wake up signal. Upon receiving this command from the control console the relay stations will wait a predetermined time after receiving the command. The predetermined time depends upon the group number of the relay station so that each group of relay stations sends a wake up signal at staggered times. Then the control console will sequentially transmit to each of the groups of relay stations a coded message commanding the relay station to interrogate its area for a particular badge. According to another embodiment of the invention, the control console sequentially instructs the groups of relay stations to perform a badge inquiry. This badge inquiry command will cause the addressed group to do both, send out a wake up signal and then interrogate its assigned area for the badge.

Figure 2:
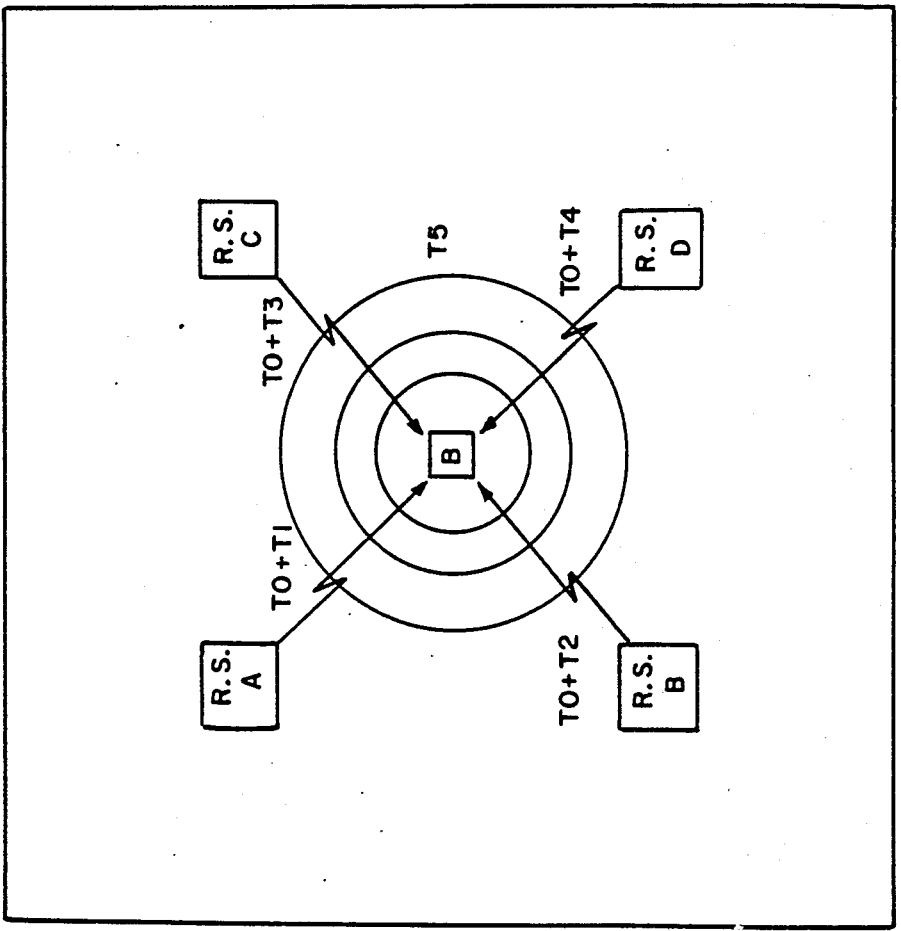
FIG. 2 is a diagram illustrating operation of a Badge response in relation to four Relay Stations.

In accordance with the first embodiment described above where all of the relay stations send their wake up signals prior to interrogating for the badge, ambiguity is avoided by allowing only one group of relay stations to send an inquiry signal with badge identification data at a given instance. Generally group A relay stations will transmit badge identification data first. The badge will wait a predetermined amount of time following the "wake up" signal before it responds to an inquiry signal. The predetermined amount of time will allow all four relay stations to transmit an inquiry to the badge. Group B relay stations will send out badge identification data second. Group C and D relay stations will follow in order at predetermined times. The badge will send out an acknowledgment if it is the badge programmed to respond to the identification data in the inquiry signal and is within range of any or all of the relay stations which has sent out the inquiry signal. If the badge being sought happens to be in the center of four relay stations from different groups as shown in FIG. 2, the acknowledgment from the badge will probably be detected by all four relay stations. In this instance, selection of the appropriate place for the call would depend on other factors, since the assumption was that all relay stations were equidistant from the badge. Normally one of the relay stations will be closer to the badge than any other and for that condition the invention provides for a method of resolving the distance to determine the closest relay station and hence direct the call to the closest telephone associated with that station.

According to an alternative preferred embodiment of the invention, each group of relay stations will be individually instructed by the control console in sequence to make an interrogation for the badge. A group which is so instructed will first send out a wake up signal followed by an inquiry signal with an identification data. If the desired badge is within the range of any of the relay stations in this group it will send an acknowledgment signal. If an acknowledgment is received the relay stations will report this data back to the control console. Then the next group of relay stations in sequence can be instructed to perform an inquiry for the badge. And the process is repeated for each of the groups of relay stations.

When the system is used to cover a large room such as is common in a manufacturing building, an advantage of the distributed intelligence can be appreciated. Several sets of Group A, B, C, and D Relay Stations are installed in the room. Alternatively, the Control Console could be programmed to operate with more than four groups of Relay Stations. At the appropriate time all Group A Relay Stations will interrogate the area. Then all B, C, and D Relay Stations will interrogate the area at the proper time for each. The Badge will respond to each Relay Station interrogation that it receives. It is very possible that more than one A, B, C, or D Station will receive a Badge response. The Control Console microprocessor will attempt to narrow the location of the Badge to the nearest telephone based on the known position of the responding Relay Stations. If an ambiguity still exists, the Control Console will address one or more specific Relay Stations with a command to lower the sensitivity of its IR receiver and then to reinterrogate the area. An alternative method would instruct the Relay Station to lower the power of the IR transmitter for the interrogation. In either case the communication range would be reduced and the link to the more remote Relay Stations would be broken leaving only the closest Relay Station receiving a response from the Badge. After this Badge response, the location of the nearest phone will probably have been identified, however, additional iterations are possible, if required.

The capacity (number of calls per hour) of the system depends on the amount of time required to locate a Badge. The preceding discussion gives examples which require the Control Console to send more than one message to several Relay Stations to determine the location of a single Badge in a situation such as described for the large room. In addition, several Relay Stations made one or more Infrared transmissions to the Badge. It is therefore important to have a fast data communication rate. A preferred embodiment shown in FIGS. 9, 10, 16, 17, 22 and 23 utilizes a data rate of 4938 bits/sec between the Control Console and the Relay Station and a bit rate of 1234.5 bits/sec between the Relay Station and the Badge. The response from the Badge to the Relay Station uses an Infrared (IR) transmitter and receiver in the preferred embodiment. An IR emitting diode is driven alternately with a first and then a second frequency at a rate of 208 Hz for a total time of 48 milliseconds. An IR receiver in the Relay Station contains a photosensitive diode that converts the Infrared energy into an electrical signal which is amplified, FM demodulated to recover the 208 Hz, and further amplified and AM detected. The detected signal is a pulse of approximately 50 milliseconds which the Relay Station microcomputer recognizes as a positive response from a Badge. The Relay Station assumes that the responding Badge is the one which was interrogated. The Relay Station responds to a request from the Control Console by sending an identification signal to the Control Console identifying the Relay Station and indicating that a positive response was received from the Badge.

Although theoretically possible, it is not very practical to measure the time that it takes for the IR signal to be transmitted from the Relay Station to the Badge or from the Badge to the Relay Station. As a result, the precise location accuracy will be limited to a distance approximately equal to one-half the distance between Relay Stations. In a large densely populated office there could be many telephones within the area between Relay Stations. When a Badge response has been pinpointed to the area of a particular Relay Station, the Control Console microprocessor will examine the information stored in the Read Only Memory (ROM) to determine whether or not the Badge belongs to a person who has an assigned telephone in that area. If it does, the Control Console will display the number of the assigned phone or instruct an automatic switchboard to ring the assigned phone. If the Badge belongs to a person who does not have an assigned phone in the area the call will be placed on an "appropriate" phone in the area. "Appropriate" phones will be marked or colored to be readily identifiable as the phones which should be picked up when a call is received by a person who is away from his assigned phone.

Figure 3:
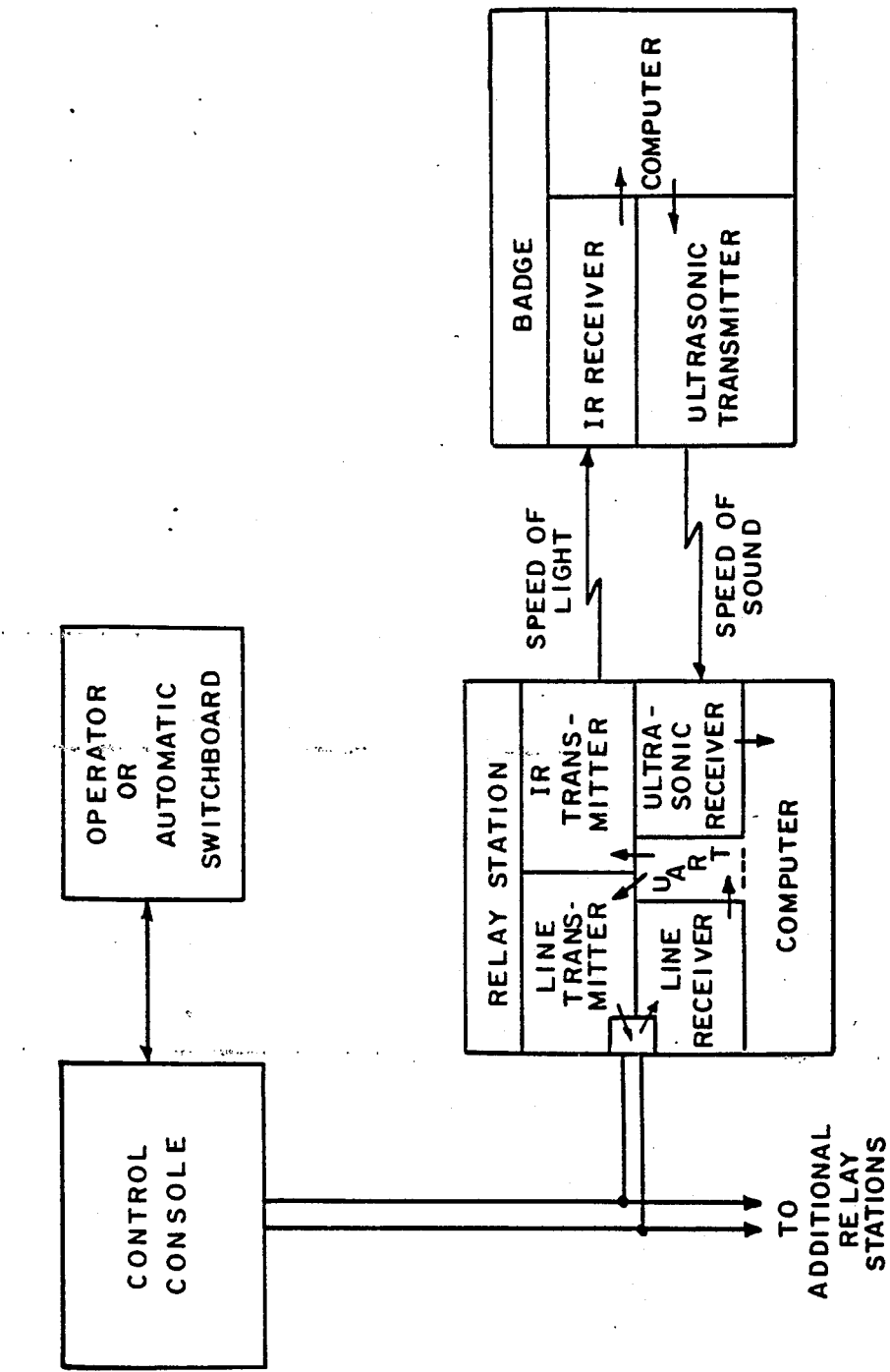
FIG. 3 is a block diagram of a system with modified transmission from the Badge to the Relay Station using ultrasonic energy.

In an alternate preferred embodiment, the return link from the Badge to the Relay Station is implemented with an Ultrasonic transmitter and receiver. Since Ultrasonic energy travels at the speed of sound rather than at the speed of light, it is practical to implement circuits that measure the time it takes for the response to get from the Badge to the Relay Station. FIG. 3 shows an Ultrasonic transmitter in the Badge and an Ultrasonic receiver in the Relay Station. The computer in the Relay Station measures the distance from the Badge. If two or more Relay Stations receive the Badge response, the Control Console can determine the Badge location with an accuracy that is within a few feet.

A typical amount of time for an interrogation to be sent from the Control Console to the Badge and for the Badge to send information back to the Control Console using the Infrared Badge to Relay Station implementation is about ¼ second. This includes the possibility that Relay Stations from all four groups (A, B, C, and D) are used in the location process. Ultrasonic Badge to Relay Station implementation increases the amount of time to complete location by approximately ¼ second.

Messages and interrogations for a particular Badge need not be for the purpose of completing a telephone call. An example of another use is to keep track of a visitor within a facility. The visitor is handed a visitor's badge when he arrives and an entry is made to the Control Console with the visitor's name and Badge number. Frequently, the Badge given to the visitor states that the visitor must be escorted. The system described by the present invention can keep track of the visitor. The system can also determine whether the visitor is with the escort. In such use the Control Console will send instructions through the Relay Station to the Badge informing the Badge that the "chime" function is to be silenced while only tracking is being performed. If there is a call for the visitor, his Badge will emit a sound, "chime", and the call will be placed on the nearest appropriate phone. From the preceding discussion, it can be seen that the system can also determine when the Badge wearing person enters an area that he or she should not and the system will alert security personnel so that an appropriate action can be taken. In this instance the Badge "chime" would be deactivated by coding the transmission to omit the "Turn Alert On" step in the program.

Control Console

Hardware Description

The Control Console is a microprocessor based system with a CRT display, a keyboard, and a serial full duplex interface with the Relay Stations. The Console may optionally include a switchboard interface circuit.

Figure 4:
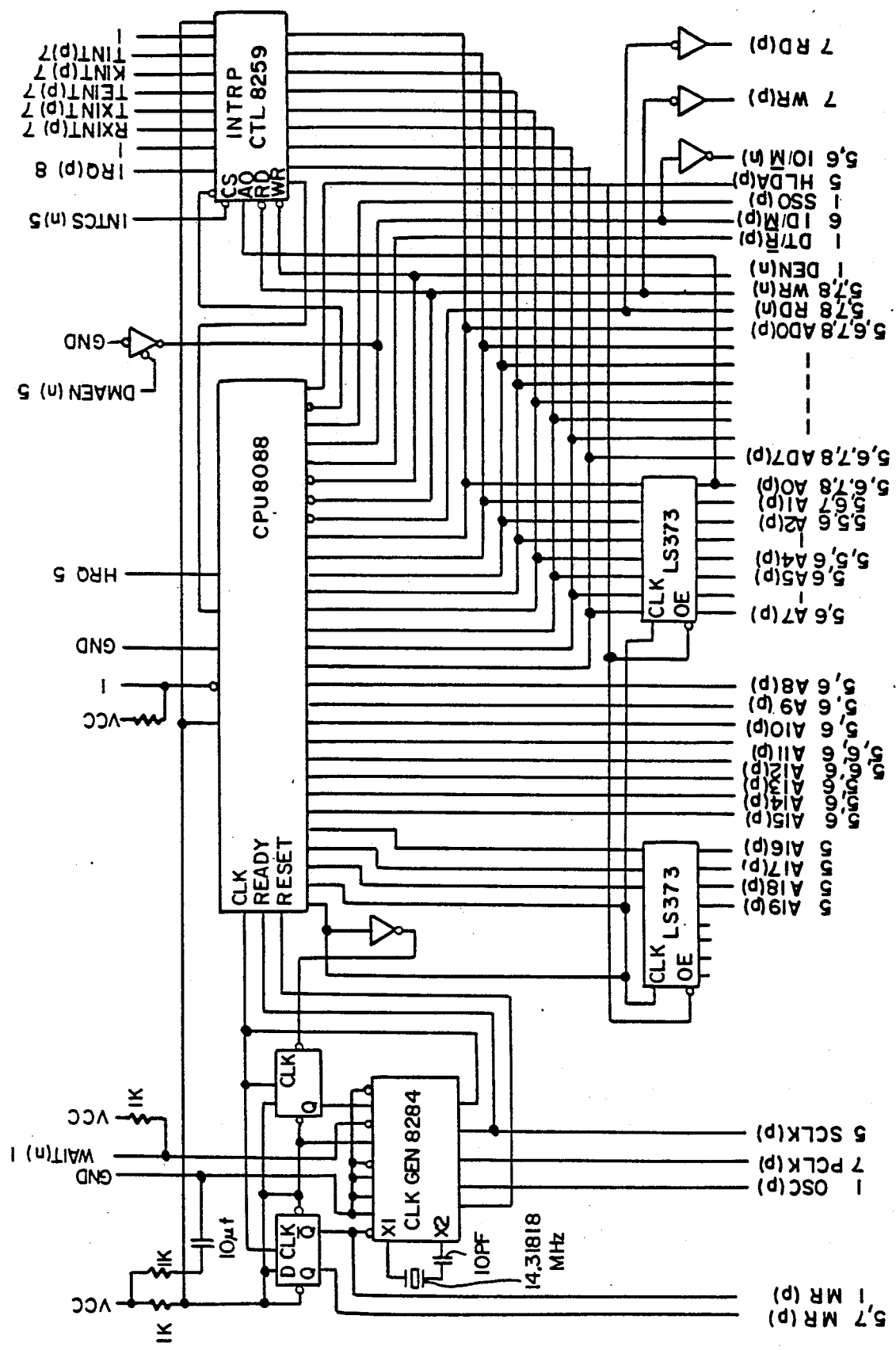
FIGS. 4, 5, 6, 7 and 8 are logic wiring diagrams for the Control Console unit.
Figure 5:
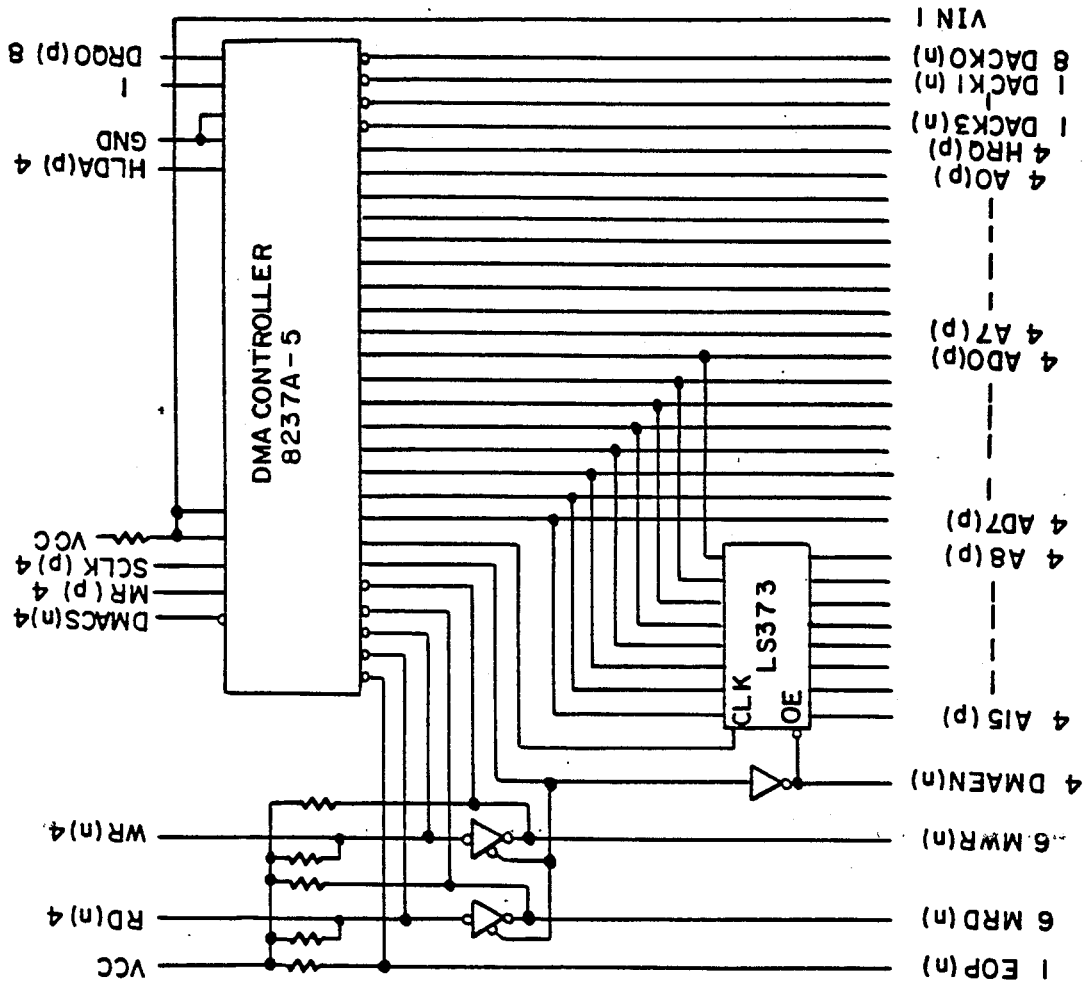
Figure 5:
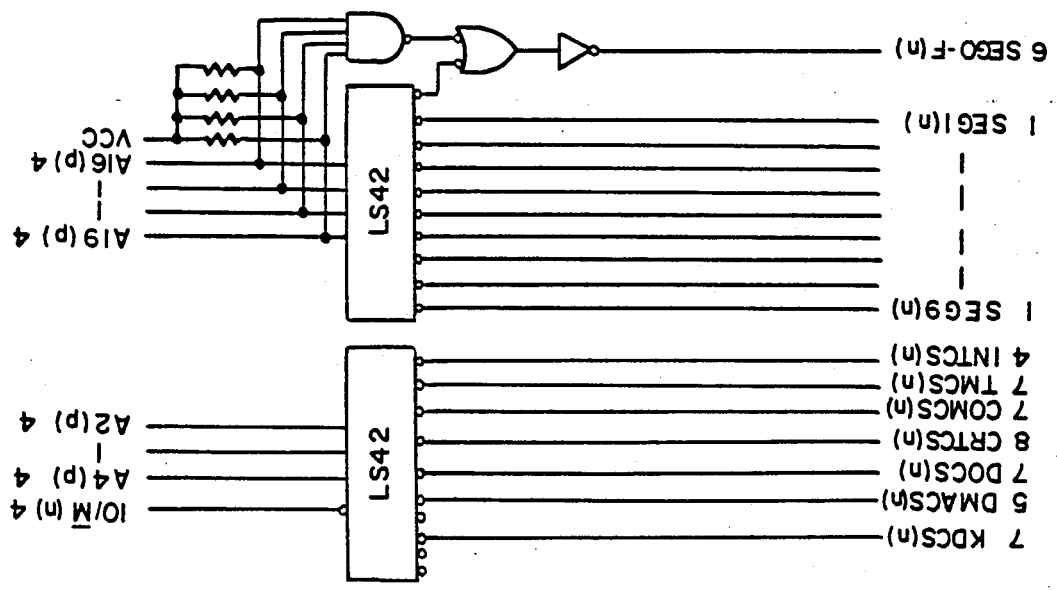
Figure 6:
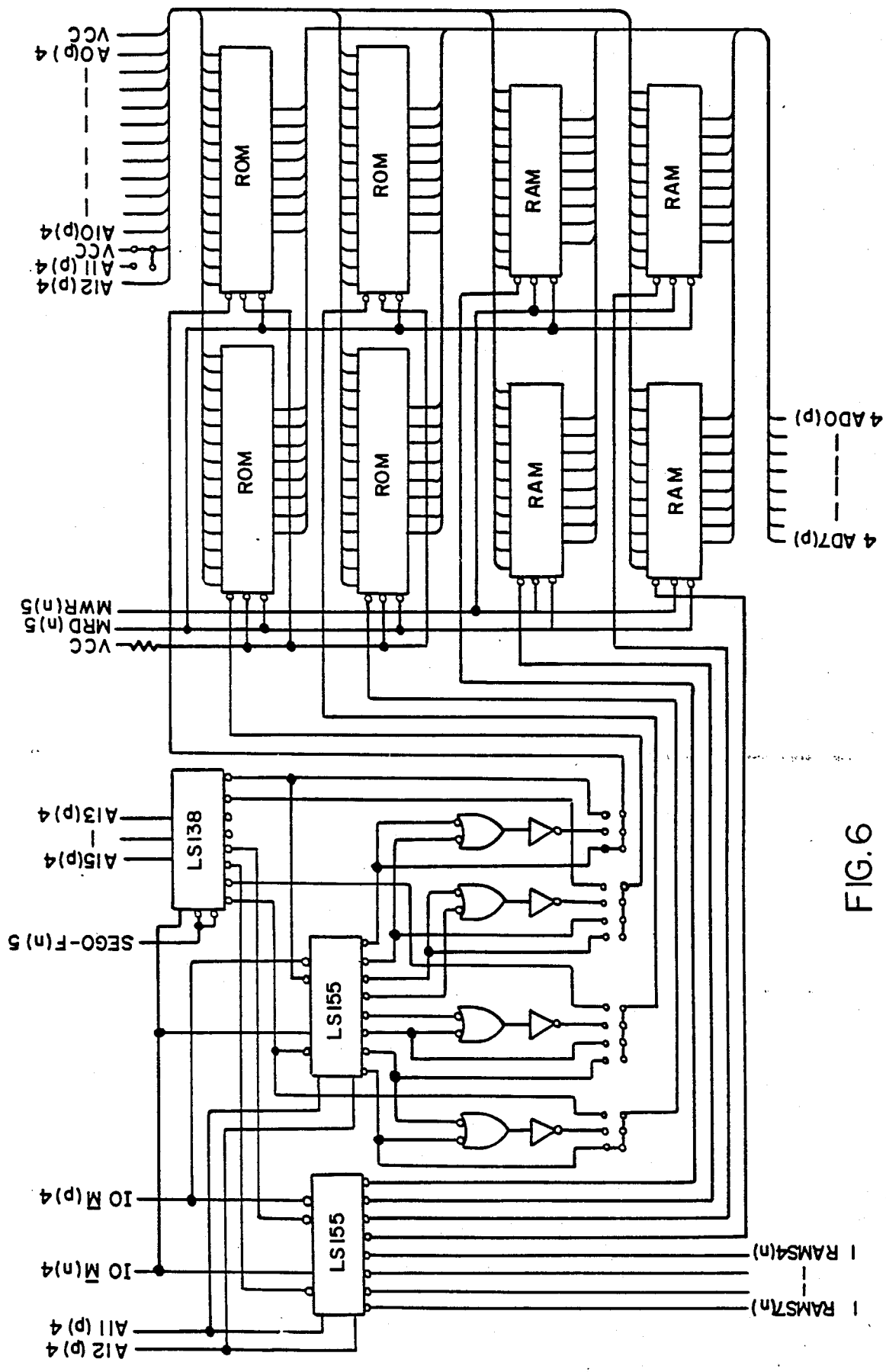
Figure 7:
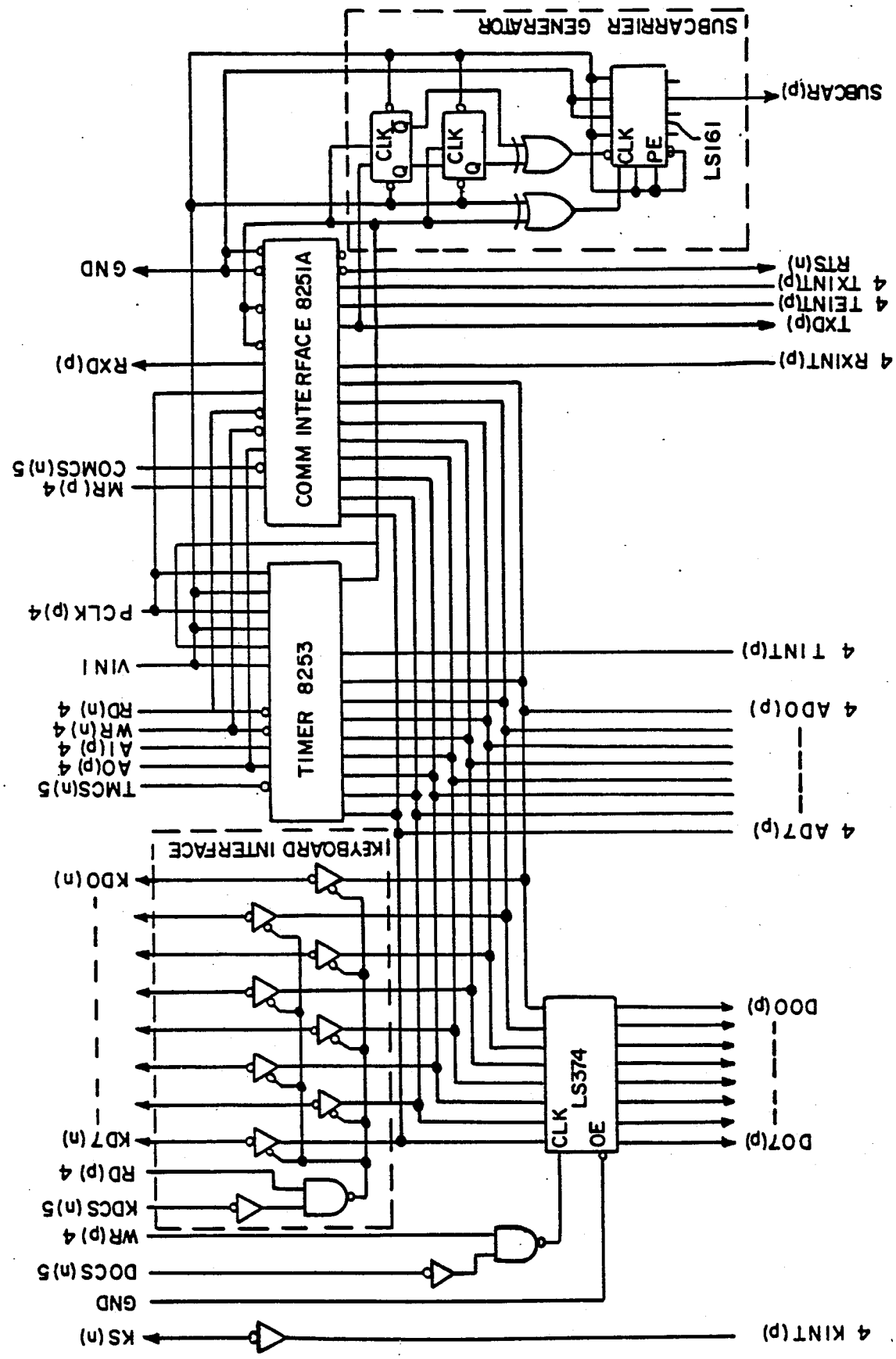
Figure 8:
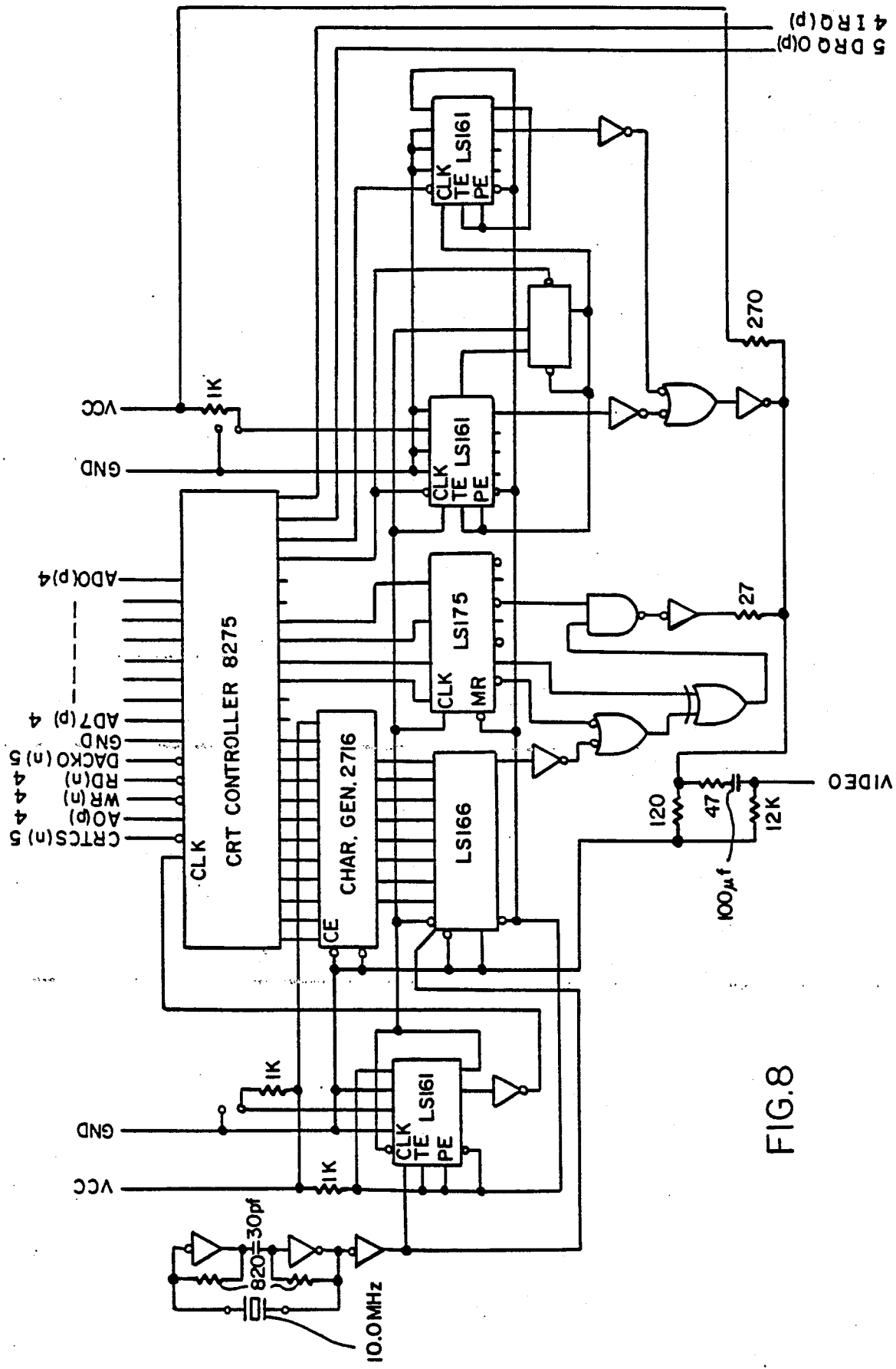

The major components of the system are:
1. Central Processing Unit (CPU)
2. Clock Generator
3. Read Only Memory (ROM) and Random Access Memory (RAM)
4. Address Latches and Decoder
5. Interrupt Controller
6. Direct Memory Access (DMA) Controller
7. Timer
8. Communication Interface Controller
9. CRT Controller, Character Generator, and CRT Sync Timing Controller
10. Keyboard Interface
11. Discrete Output Drivers
12. Subcarrier Generator
13. Carrier Current Transmitter
14. Carrier Current Receiver FIGS. 4-8 inclusive are logic diagrams of the Control Console which are drawn using logic diagram conventions. Thus, signal lines appearing at the top or the left are generally incoming signals and those at the bottom or the right of the drawing are outgoing signals. Some of the signal lines are bidirectional. Each signal line is identified with an appropriate alpha-numeric legend which can be described as follows. For example, in FIG. 4 a latch U24 is shown as an integrated circuit designated LS373. On pin 6 of U24 the signal line has the designation 5,5,6,A2(P). This designation indicates that the signal appears twice in FIG. 5 and once in FIG. 6. The remainder of the designation A2 is arbitrary but may indicate for example, address bit 2. The (P) indicates that the signal is true when the level is positive. An (N) would indicate that the signal is true when negative.

The system disclosed in the logic diagrams uses standard IC components including Intel designations but it will be understood that equivalents may be used.

1. Central Processing Unit (CPU) (Reference FIG. 4)

The Central Processing Unit (CPU) is a medium-speed 8 bit microprocessor with a 16 bit internal architecture such as type Intel (8088). A lower or higher performance CPU may be used as required by the particular system and the design of the system may be modified as necessary to accommodate the CPU.

2. Clock Generator (Reference FIG. 4) Intel 8284

This unit generates the system clock CLK, the peripheral clock PCLK, reset, and ready signals required for the CPU and the rest of the system.

3. Memory (Reference FIG. 6)

There are three types of memory used in this system, i.e. read only memory (ROM) where the system program, and permanent and semi-permanent data are stored, random access memory (RAM) used by the program as a scratch pad, temporary data storage and program control, and non-volatile memory where any update on the permanent data will be entered.

Figure 11:
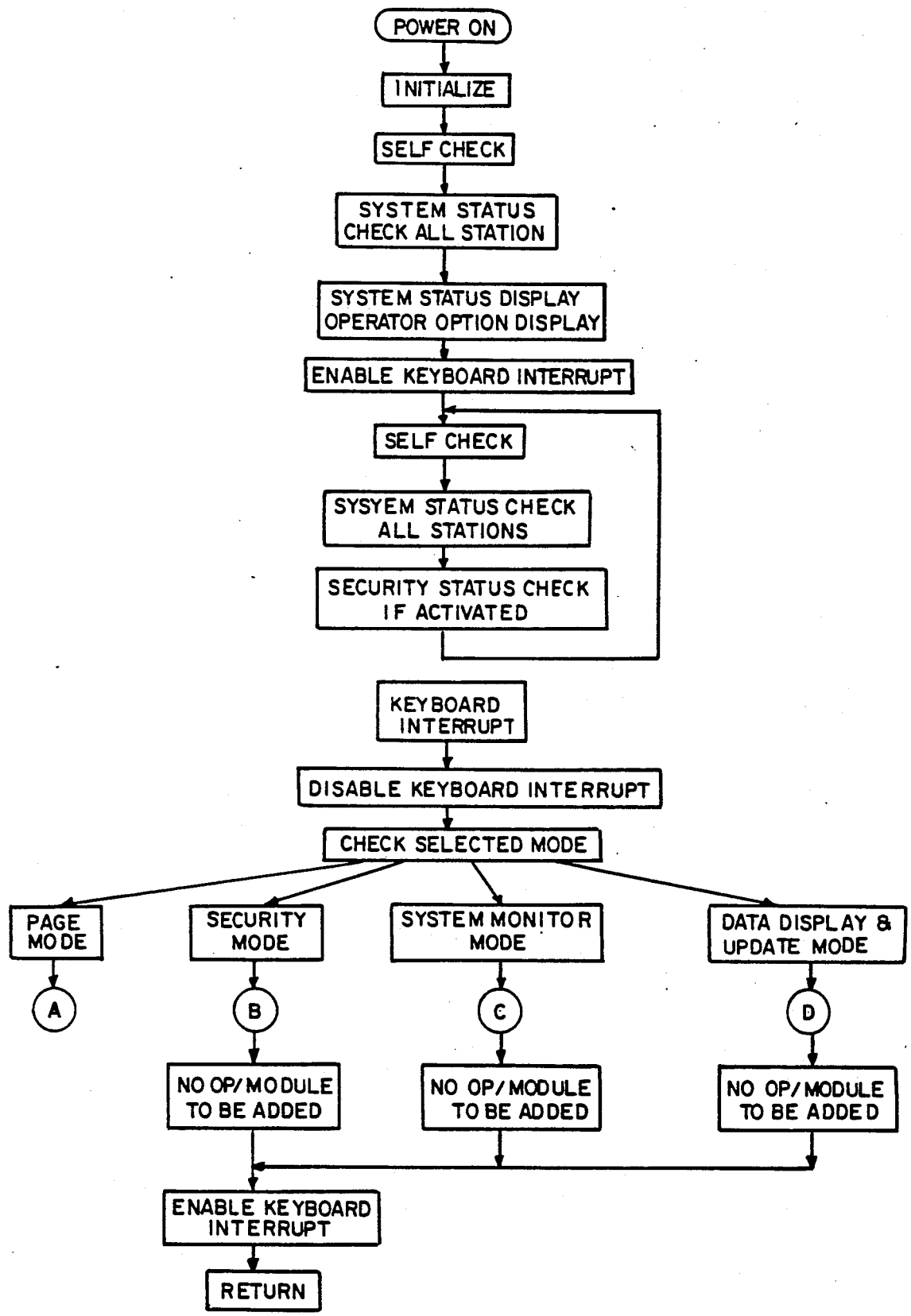
FIGS. 11, 12 and 13 are the flow charts for the Control Console software.
Figure 12:
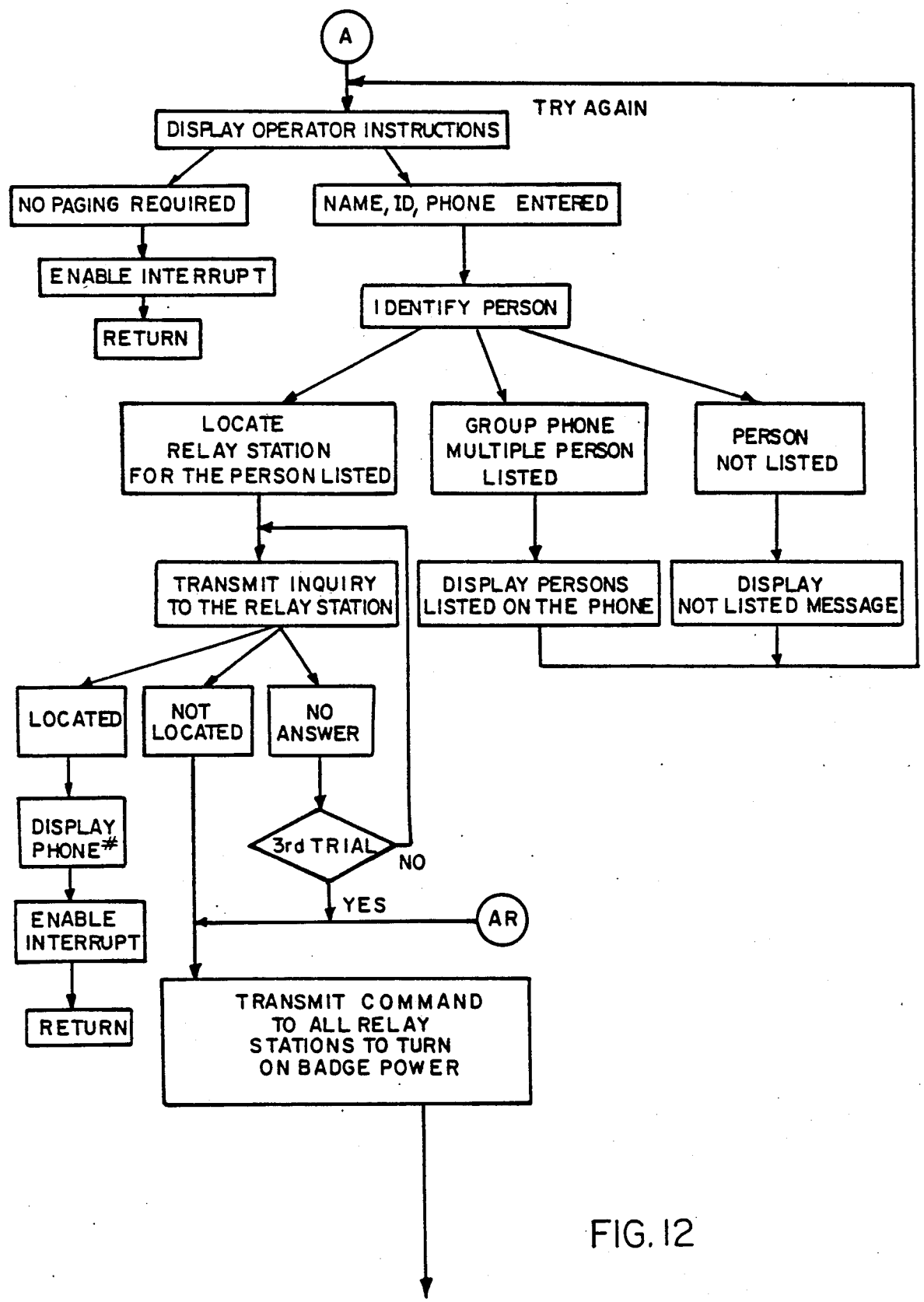
Figure 12:
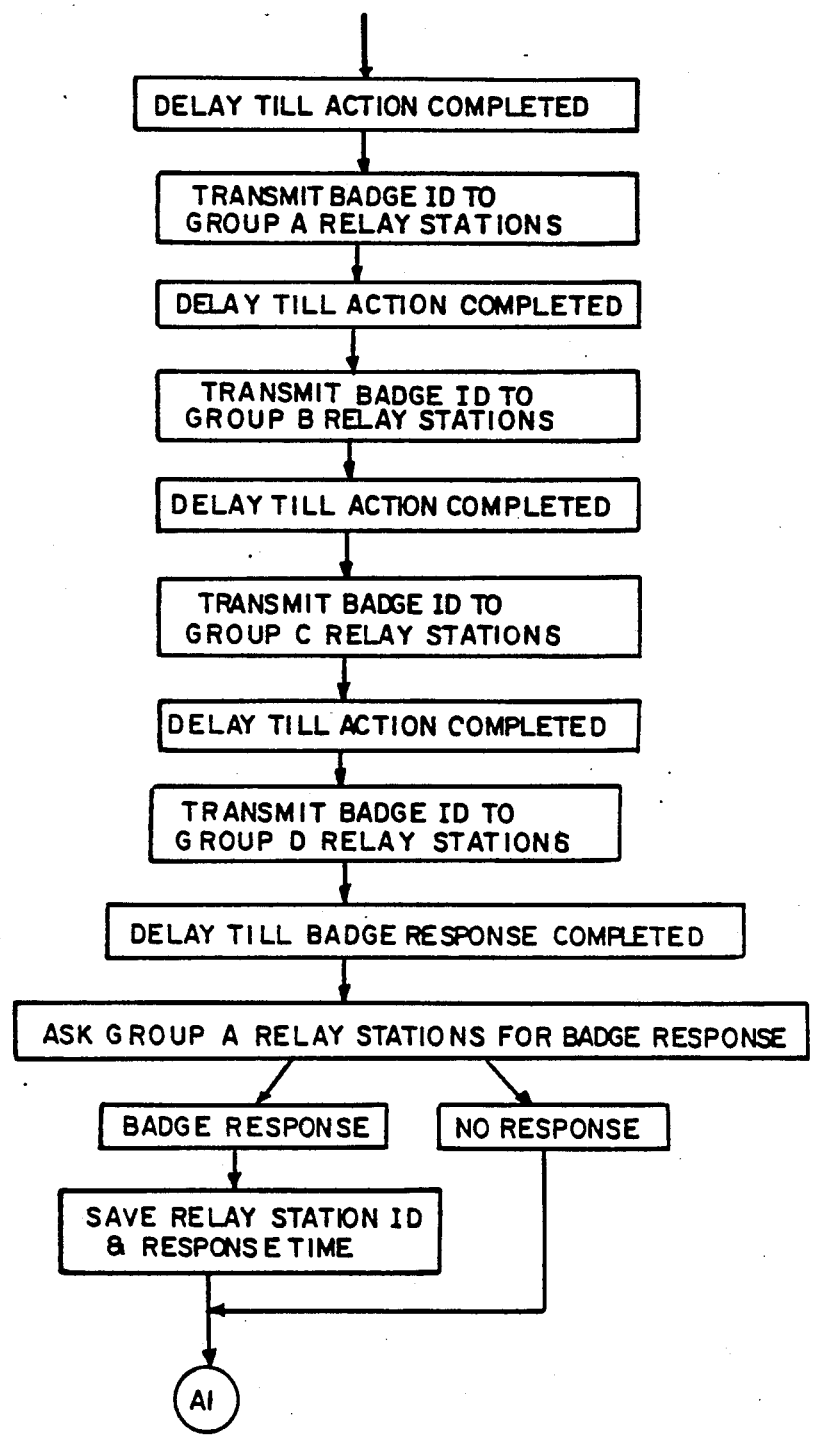
Figure 13:
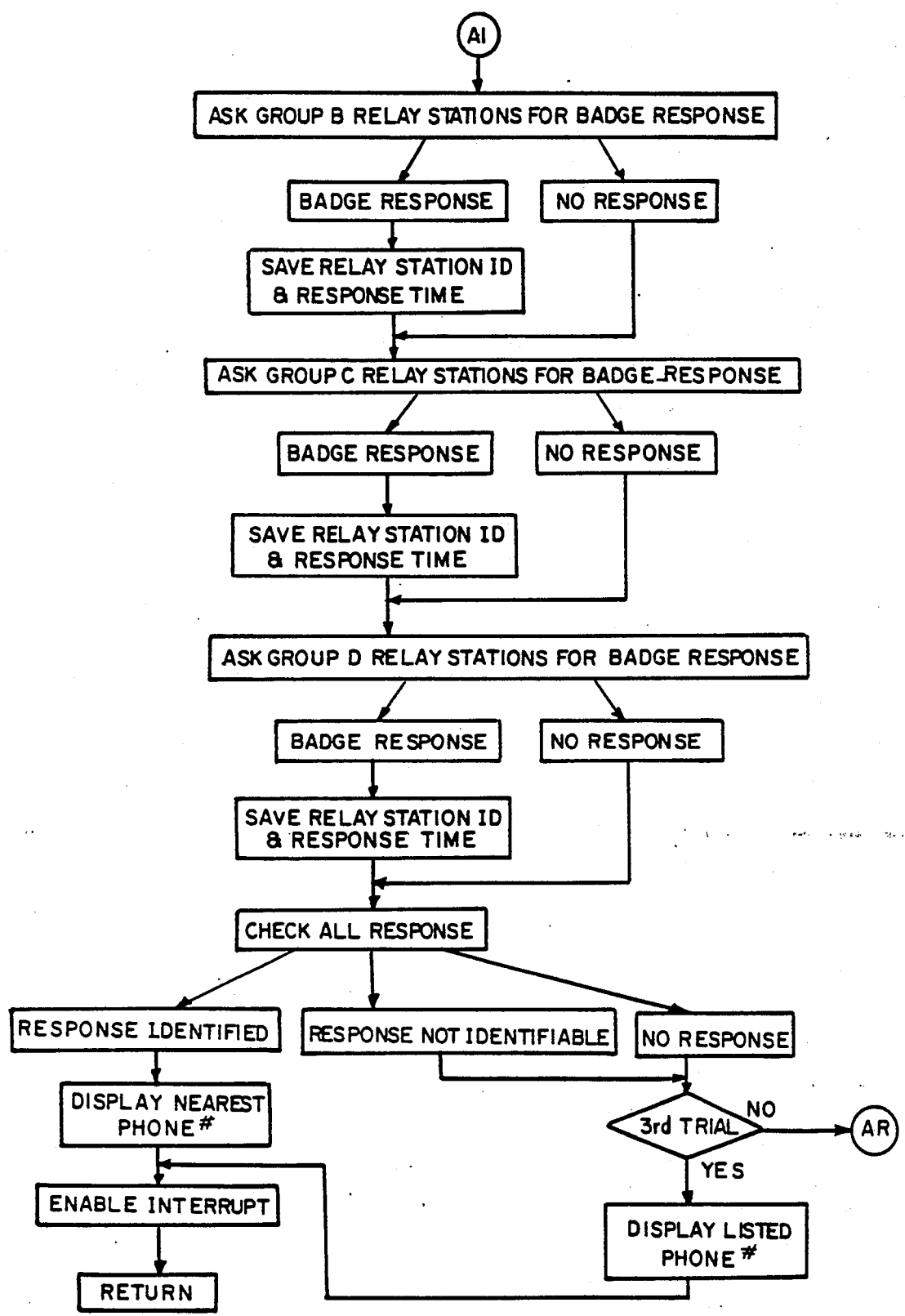

The ROM used in the system may be either programmable or mask programmed ROM. The standard system program FIGS. 11, 12 and 13, is normally stored in the masked ROM, whereas special customized program and data are stored in the programmable ROM.

The non-volatile memory may be an electrically alterable ROM (EAROM), an electrically erasable ROM (EEROM), or a CMOS RAM with a battery backup.

4. Address Latches LS373 and Decoders LS42, LS138, LS155 (Reference FIGS. 4, 5 and 6)

This circuitry latches the memory and I/O address, and decodes it to enable the proper memory or I/O circuit to be accessed by the CPU. There are enough decoded lines so that additional memory and I/O can be easily implemented by adding required hardware.

5. Interrupt Controller (Reference FIG. 4) Intel 8259

The interrupt controller is a programmable device and may be reconfigured by the CPU to change the priority, enable and disable individual interrupt lines, and sense the interrupt line status. The device generates the interrupt status signal to the CPU and vectors the program to an appropriate memory location based upon the programmed data.

6. Direct Memory Access Controller (Reference FIG. 5) Intel 8237 A-5

The DMA controller interrupts the normal program sequence and accesses the memory when requested by the device connected to the controller. The device is also programmable such that in addition to all parameters required for the DMA activities, various modes of operation are selectable.

7. Timer (Reference FIG. 7) Intel 8253

There are three 16-bit timer/counters in the Intel 8253 timer. The timer is used to generate the clock OUT 0 required for the serial communication device and the clock OUT 2 for the software timing. Output of the timer used for the software timing OUT 2 is connected to the interrupt controller so that an interrupt may be generated when the program requires attention at a certain time.

8. Communication Interface Controller (Reference FIG. 7) Intel 8251 A

The communication interface controller is used for the serial communication link with the Relay Stations. The controller converts a parallel byte of data from the CPU to a serial 10-bit format with an even parity bit and transfers it to the carrier current transmitter to be transmitted to the Relay Stations. It also accepts the serial data from the carrier current receiver and converts it to an 8-bit parallel byte to be transferred to the CPU. The controller checks for parity errors, format errors and overrun errors when receiving the data.

9. CRT Controller and Interface (Reference FIG. 8) Intel 8275

The CRT controller generates the vertical sync and horizontal sync signals required for a CRT display monitor. The video signal is generated by reading the contents of the memory where the display information is stored through the DMA controller FIG. 8 Intel 8275, and converting the code to a 5×7 matrix using the character generator. The character generator is a programmable ROM Intel 2716, so that the font can be varied to suit any customer requirement. The screen format may be varied with jumper plugs and software for different screen sizes and information display.

10. Keyboard Interface (Reference FIG. 7)

The keyboard data is sampled and transferred to the CPU via a set of tri-state gates. The keyboard strobe signals presence of valid key data.

11. Discrete Output Drivers (Reference FIG. 7) LS374

An 8-bit register is set and/or reset by the CPU for general purpose discrete signals to be used by the system.

12. Subcarrier Generator (Reference FIG. 7)

The subcarrier signal used for the carrier current transmitter is generated by the circuit to synchronize the data and the subcarrier.

13. Carrier Current Transmitter (Reference FIGS. 9 and 26)

Figure 9:
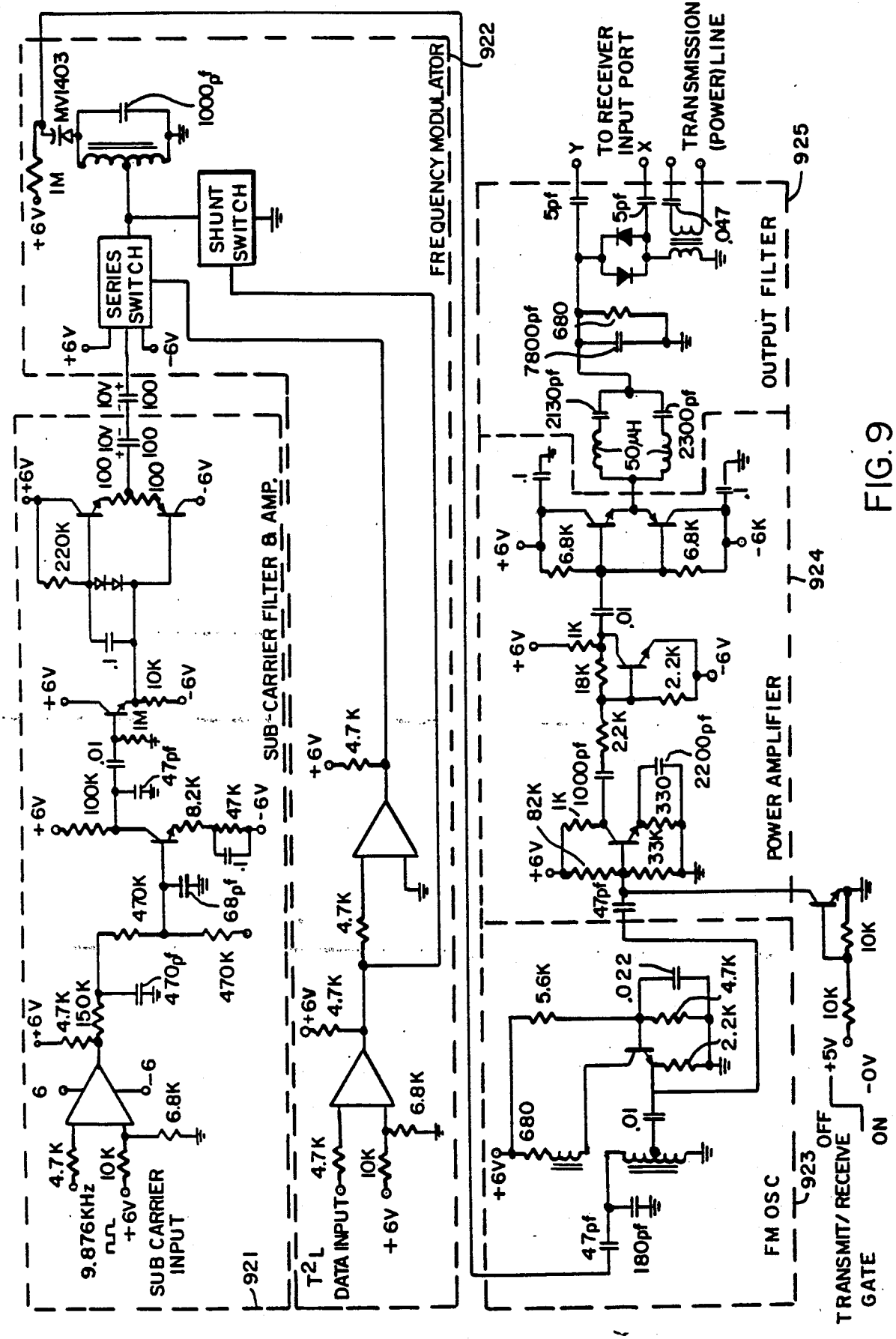
FIG. 9 is a schematic wiring diagram of the FM carrier current transmitter as used in the Control Console and the Relay Stations.

FIG. 9 shows a schematic diagram of a preferred embodiment of a carrier current transmitter. A subcarrier filter/amplification circuit 921, frequency modulator 922, oscillator 923, power amplifier 924 and an output filter 925 are the constituent parts of the carrier current transmitter.

The subcarrier frequency (9.876 KHz) is generated by the Subcarrier Generator (FIG. 7) and is in square-wave form when applied to the subcarrier filter/amplification circuit 921. Amplification is accomplished by buffer amplifier U1A and transistors Q1, Q2, Q6 and Q7. Resistor capacitor networks R1C1, R2R3C2 and R4C3 serve to modify the shape of the subcarrier waveform to approximate a sine wave.

Digital data to be transmitted by the Control Console to the Relay Stations is generated by the Communication Interface (FIG. 7) and is phase locked to the subcarrier frequency. The frequency modulator 922 accepts the data stream, buffers and level shifts it via comparators U1B and U1C, and uses it to switch the subcarrier sinusoid on and off. Analog bilateral switches U2AB and U2CD, under control of the data state from U1B or U1C either connect ground (logic "0") or the subcarrier waveform (logic "1") to the primary center tap of transformer T1. This results in a 100% amplitude modulated subcarrier waveform.

After being stepped up by a factor of two by action of transformer T1, the data modulated subcarrier is applied to varactor diode CR1. By causing the total reverse bias voltage applied to CR1 to vary, the modulation waveform changes the effective capacitance of CR1.

A free running feedback oscillator is formed by Q3, transformer T2 and the combined resonating capacitance of C4, C5 and CR1. The relative values of capacitance and the sensitivity of CR1 capacitance to bias (modulation) voltage have been chosen to produce a frequency deviation of the 474.048 KHz carrier oscillator frequency of ±16 KHz at the 9.876 Hz subcarrier rate whenever a logic "1" occurs in the data stream to be transmitted. Logic "0" levels do not affect the oscillator frequency and so result in the transmission of the 474.048 KHz carrier with no frequency deviation.

Power amplification of the frequency modulated oscillator signal is accomplished by Q4, Q5, Q9 and Q10. Two series tuned inductor/capacitor circuits L1, C6 and L2, C7 are used to couple into the output transformer T3. Transformer T3 is resonated by capacitor C8 to reduce the harmonic content of the output signal. The two series tuned circuits are tuned to 490 KHz and 458 KHz, which are very near the 474.048 KHz ±16 KHz and 474.048 KHz −16 KHz points. Matching to an anticipated load impedance of approximately 10 ohms (e.g. the power line) is provided by the 3.3 to 1 step down ratio of T3. An output power level of approximately 75 mW is delivered to a 10 ohm load. Isolation from the power line 60 Hz is the function to C9.

Since the same power line or dedicated wire pair connection may be used to transmit and to receive, and since the transmitted and received frequencies can be near to each other (474.048 KHz and 316.032 KHz, respectively, for instance) a means is provided to prevent the transmitter's output signal from obscuring the received signal. The method chosen for this implementation uses a transmit/receive gate signal from the processor and a pair of switching diodes, CR2 and CR3.

When data transmission is desired, the processor forces the T/R gate signal low, turning off transistor Q8 and allowing the power amplifier to function as previously described. Since the peak-to-peak signal amplitude from the L1, C6, L2, C7 network is much larger than the forward voltage drop of CR2 and CR3, little attenuation occurs and nearly all of the amplifier signal reaches T3 and is transmitted.

When reception of an incoming signal from a Relay Station is expected, the processor raises the T/R gate signal level. This turns transistor Q8 on and removes the oscillator signal from the power amplifier input (Q4 base). An incoming signal is coupled through C9 and T3. The received peak-to-peak signal level will most likely be less than the forward voltage drop of CR2 and CR3, so the full signal will appear between points X and Y for application to the receiver input terminals.

Figure 26:
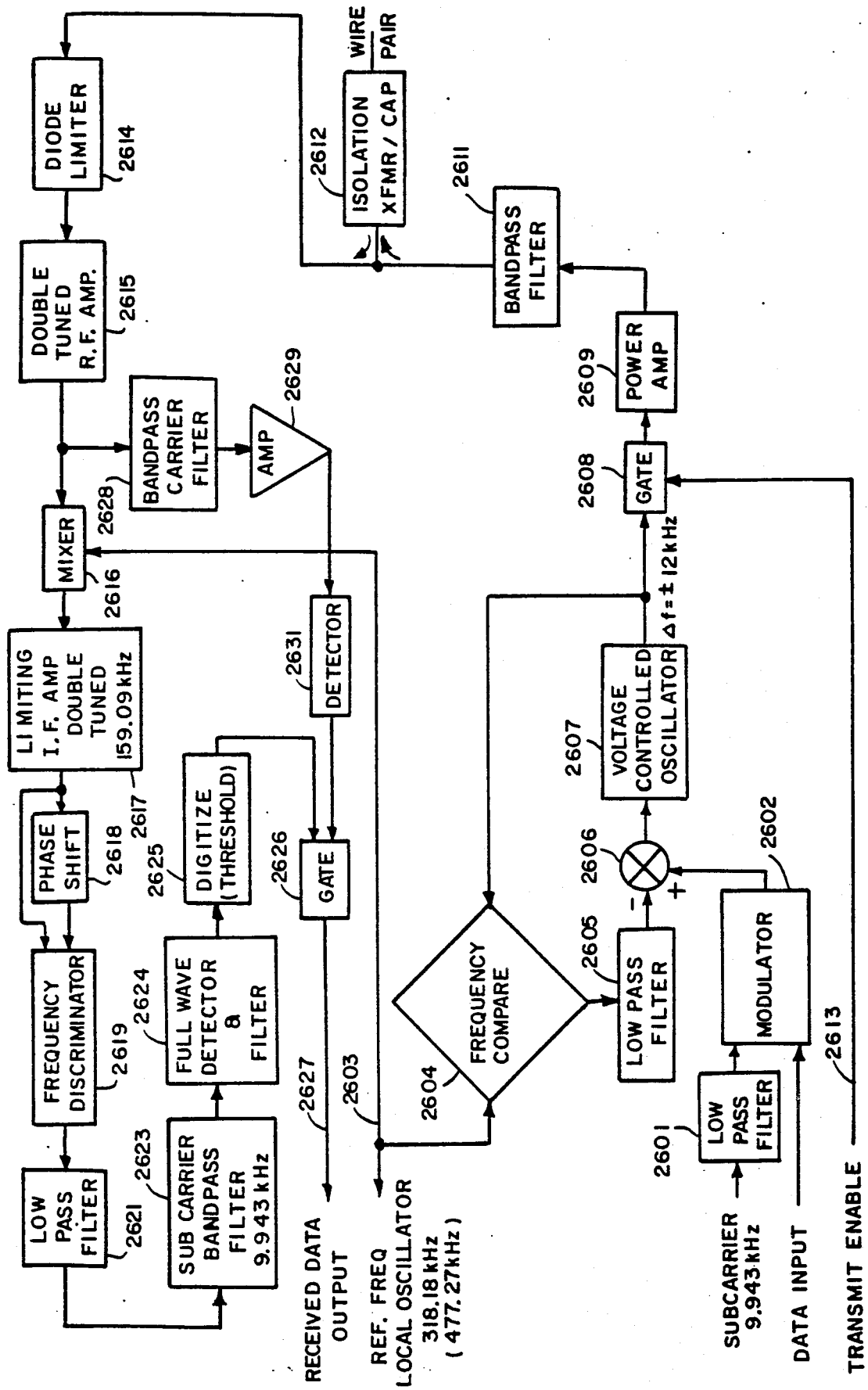
FIG. 26 is a presently preferred embodiment of a carrier current receiver/transmitter.

A presently preferred embodiment of the carrier current transmitter is described in the next section with reference to FIG. 26.

14. Carrier Current Receiver (Reference FIGS. 10 and 26)

Figure 10:
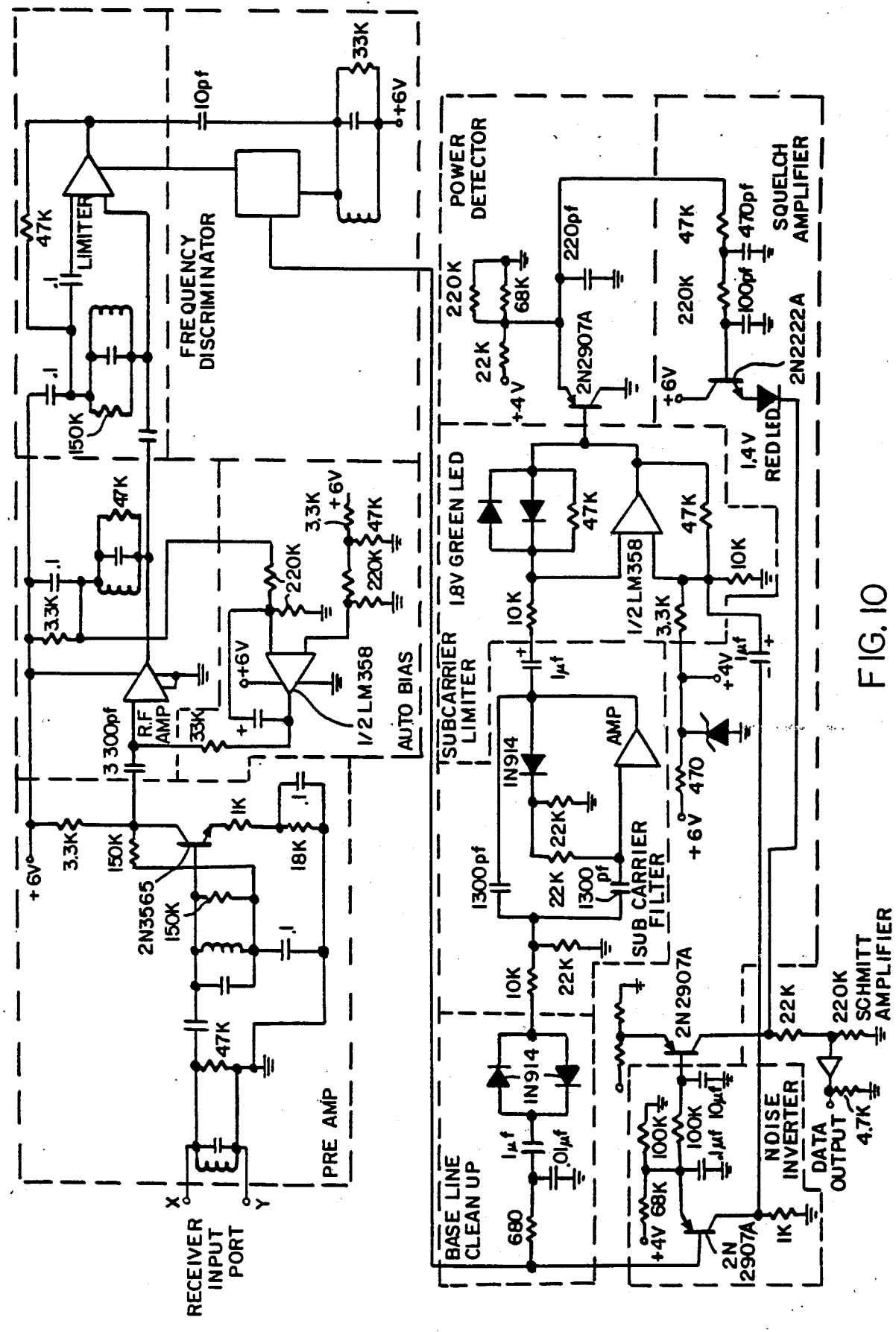
FIG. 10 is a schematic wiring diagram of the carrier current receiver as used in the Control Console and the Relay Stations.

Referring now to FIG. 10, the input signal to the carrier current receiver is taken from the power line (or other wire pair) via a connection (terminals X and Y, FIG. 9) from the output filter 25 and applied to a double tuned filter circuit (L1, C1, L2, C2, C5). This filter has a bandpass characteristic centered at 316.032 KHz with peaks of maximum response at 305 KHz and 327 KHz. PREAMP transistor Q1 is used to provide a high impedance load for the double tuned circuit and to match the input impedance of the RF amplifier U1A. An operational amplifier circuit, U2A, (AUTO BIAS) is used to maintain the PREAMP within its relatively narrow dynamic operating range.

A second double tuned bandpass filter circuit (L3, C3, L4, C4, C6) with 316.032 KHz center frequency and 305 KHz, 327 KHz peak frequencies follows the RF amplifier and feeds into limiting amplifier U1B. After limiting, the signal is applied both directly and in quadrature (via C8, C7, L5) to a FREQUENCY DISCRIMINATOR, U1C. The FREQUENCY DISCRIMINATOR extracts the 9.876 KHz amplitude modulated subcarrier from the two inputs.

Next, a BASE LINE CLEAN UP circuit (CR1, CR2) provides a threshold to remove some of the base-line (low level) noise. This is followed by a filter circuit (SUBCARRIER FILTER) (U1D) tuned to the subcarrier frequency. A limiting amplifier, (SUBCARRIER LIMITER) U2B, provides additional gain to drive detector transistor Q2 (POWER DETECTOR). This detector and the associated low pass filter (R1, R2, C9, C10, C11) remove the amplitude information (data) from the subcarrier. Transistor Q3 acts as a buffer amplifier (SQUELCH AMPLIFIER) to prevent loading of the low pass filter by Schmitt trigger U1E. Additional noise immunity and conversion of the data from analog to logic compatible (pulse) form is accomplished by the Schmitt trigger U1E (SCHMITT AMPLIFIER).

Large noise signals, which are often present when the received carrier current level is too weak to drive the limiting amplifier (U1B) into its limiting range, are removed by a NOISE INVERTER stage (Q4). By comparing the discriminator output to a fixed threshold level set by R3, R4 and CR3, a cancellation signal can be generated whenever a noise spike exceeds the threshold level. Coupling capacitor C12 provides the path for this cancellation signal to reach the limiting amplifier (U2B) and prevent the noise signal from being misinterpreted as an element of data.

If large noise signals are present for an extended period—as determined by the time constant of the R3, R4, R5, C13, C14 network—squelch transistor Q5 will be turned on to hold the input of the Schmitt trigger (U1E) at a high level. As a result, the data output line will be held low (logic "0").

Referring now to FIG. 26, a block diagram describes a presently preferred embodiment of the carrier current receiver transmitter as it would be used in either a Relay Station or the Control Console. The improvements represented in FIG. 26 provide enhanced signal characteristics in both the transmitter and the receiver. FIG. 26 corresponds in function to the carrier current transmitter previously described with reference to FIG. 9 and the carrier current receiver described with reference to FIG. 10. The subcarrier input frequency, as previously described, in FIG. 26 is passed through a low pass filter 2601, which operates as a double integrator to convert the input square wave to an approximate sine wave. In this modification FIG. 26's slightly different frequencies have been employed for convenience and availability of standard crystal frequencies. The output of filter 2601 is applied to modulator 2602, which also receives an input from data line to gate the output of the modulator on and off in accordance with the binary data on the data line. Instead of the frequency modulated oscillator shown in FIG. 9, the modification of FIG. 26 receives a reference frequency on line 2603 from the logic that is used both as the transmitter carrier reference frequency and as the local oscillator frequency for the receiver. This frequency on line 2603 is applied to a frequency comparator 2604, the output of which passes through low pass filter 2605 and is applied to a summing junction 2606 which also has applied thereto the output of modulator 2602. The output of summing junction 2606 is the error signal applied to voltage controlled oscillator 2607, the output of which is applied for comparison to frequency comparator 2604 and also supplies the carrier frequency output which passes through gate 2608. The error voltage input to voltage controlled oscillator 2607 is deviated by the output of modulator 2602 to cause the output of the oscillator to deviate above and below the center carrier frequency by 12 KHz. This frequency modulated carrier when it passes gate 2608 is power amplified in power amplifier 2609 and passed through band pass filter 2611 to supply the output wire pair after passing through isolation transformer and capacitor unit 2612.

The gate 2608 acts to short circuit any carrier signal input to power amplifier 2609 when the input on line 2613 does not enable the gate 2608. The purpose of transmit enable and disable on line 2613 is to assure that there is no transmitter signal leakage through the power amplifier and to the output wire pair when the unit is in receiving mode and an incoming low level signal is being received.

An incoming signal on the wire pair passes through the isolation transformer and capacitor 2612 and is applied to a diode limiter 2614 to limit high level signals or transients. The output of limiter 2614 is amplified in a double tuned RF amplifier 2615 the output of which is applied to a mixer 2616. The output of mixer 2616 is frequency demodulated after going through a limiting RF amplifier 2617. Frequency discriminator 2619 which receives two inputs, one from the limiting amplifier 2617 and one through the phase shifter 2618. Phase shifter 2618 provides the quadrature relation between the input signals to the frequency discriminator 2619 required for detecting the frequency modulation on the carrier. The output of frequency discriminator 2619 passes through a low pass filter 2621 which allows the modulation received on the incoming signal to pass while higher frequency noise is attenuated. The output of low pass filter 2621 is applied to a bandpass filter 2622 which operates with respect to a center frequency at the subcarrier frequency to discriminate against all but the subcarrier data signal, which is then applied to a full wave detector and filter 2624. The output of full wave detector 2624 passes through a threshold circuit 2625 which digitizes the signal to provide a binary signal to gate 2626 and which when enabled passes the data to output line 2627. Gate 2626 is enabled only when a sufficiently strong carrier is received and for this purpose the output of amplifier 2615 passes through a band pass carrier frequency filter 2628 and is further amplified in amplifier 2629 and detected in detector 2631. The output of detector 2631 provides the gating signal for gate 2626 so that is passes data to output line 2627 only when a sufficiently strong carrier frequency signal has been received.

Software Description

The Control Console software is organized to perform in response to tasks selected by the operator or to external signals such as incoming phone calls. The Console is interrupt driven so that background tasks will be continuously executed when no other functions are required as shown in FIG. 11.

After the power-on initialization, the program will perform self-check diagnosis, and will check the system status by interrogating all of the Relay Stations to obtain their current condition. The result of these tests and the current system status are then displayed on the CRT together with the operator instructions and options available. The Console will proceed to perform the self-check and the system status check updating the system performance parameters as long as no other tasks are requested.

When the operator or an external signal selects a task, the program is interrupted and the selected task will be executed. New tasks may be added to the Control Console and old tasks may be modified without changing the Console's main program and the other task processors. After the completion of the selected task, the program will return to the background routine (self-check and system status check) until another task interrupts the program.

In the software disclosed in FIG. 11, the selection of various tasks is indicated under "Check Selected Mode" in the flow chart. Thus a paging mode, a security mode, a system monitor mode, and a data display and update mode are indicated as selectable options. Only the paging mode is further implemented in the disclosure as shown by the paging flow charts of FIGS. 12 and 13. The other options would require the addition of modules and software as indicated under B, C and D in FIG. 11.

Referring now to the paging task processor shown in FIGS. 12 and 13, one of the primary functions of the system is to locate the Badge unit identified by the operator or the incoming phone call. This task processor is initiated by the operator or by an incoming phone call if the system is connected directly to the switchboard. The flow chart describes the manual operation. When an automatic switchboard is used to make the connection rather than an operator, display and manual keyboard entry processes will be bypassed.

Figure 13A:
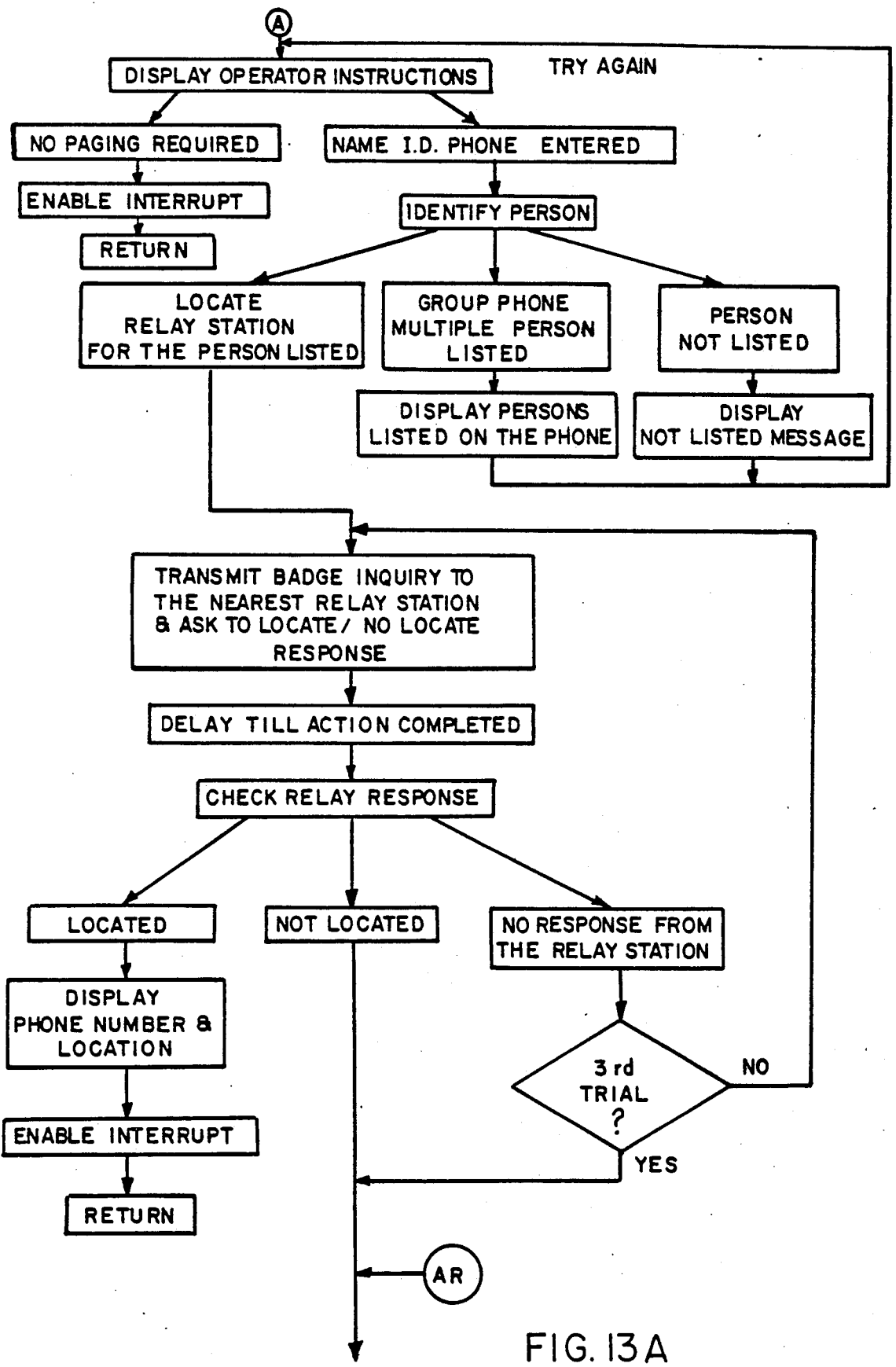
FIG. 13A is a presently preferred embodiment of the flow charts of FIGS. 12 and 13.
Figure 13A:
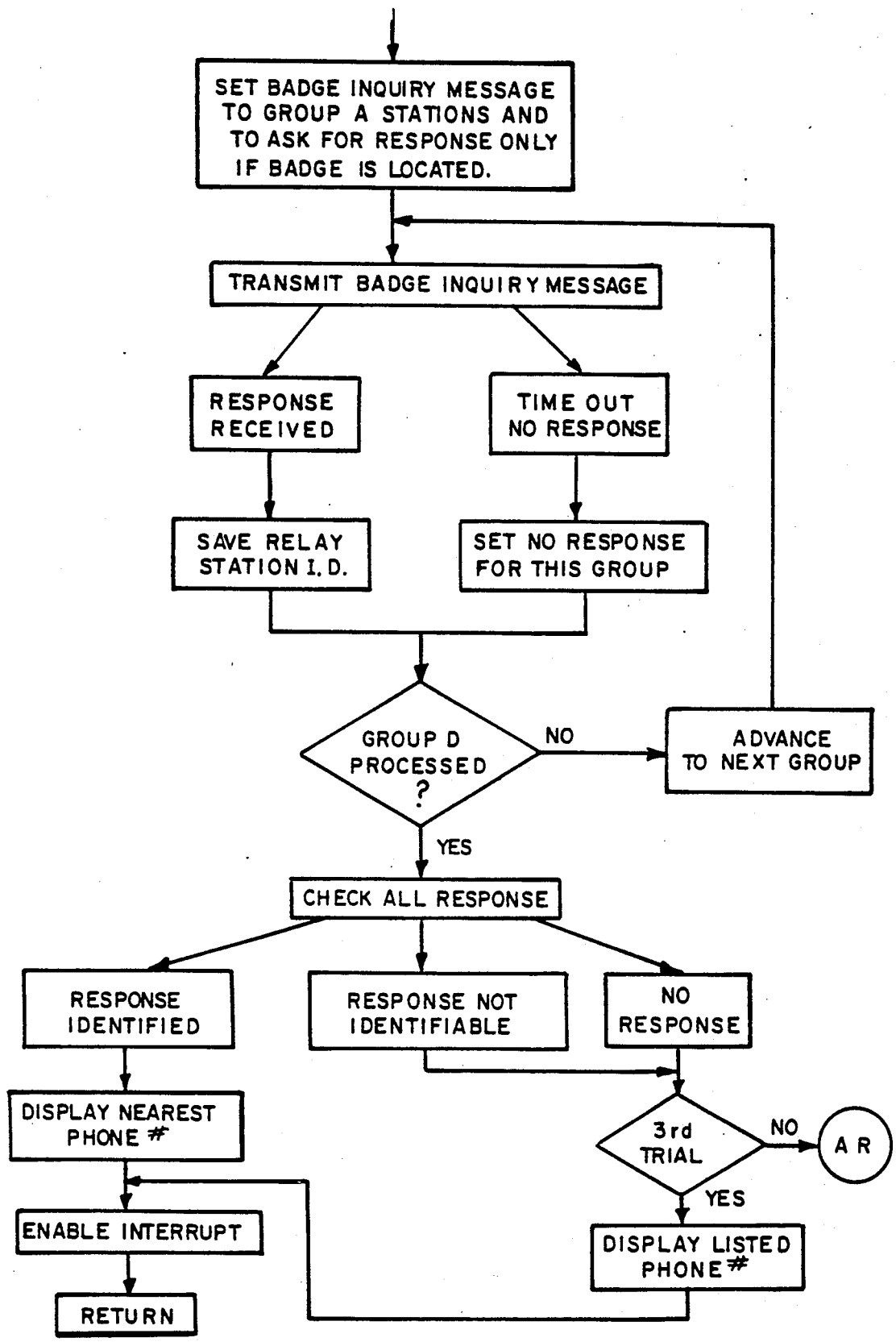

The program displays the instructions and options to the operator and waits for the keyboard entry completion which will be entry of either name, ID or phone number. If the phone number entered is listed for more than one person, all persons listed with the number will be displayed on the CRT ("Multiple Person Listed"). The operator will be directed by the display to make a proper selection. ("Display Person Listed on the Phone") If the person or the number entered is not listed in the directory, the CRT will display "Person Not Listed" and the operator will be directed to try again. The operator may exit from the page task Processor at this point if no action can be taken. ("No Paging Required") If the entry is valid ("Identify Person" is true), the Relay Station closest to the listed phone number is interrogated ("Locate Relay Station for the Person Listed") to locate the identified Badge unit. The Console program generates a coded badge inquiry message ("Transmit Inquiry to the Relay Station") addressed to the nearest Relay Station asking the Relay Station to respond with the message ("Located" "Not Located" "No Answer") whether or not the badge has been located. The program waits for the Response for a predetermined time (for this example approximately 120 msec after the inquiry message has been transmitted). If no response is received ("No Answer") from the Relay Station, the coded inquiry message will be transmitted again. The inquiry will be tried up to 3 tries "3rd Trial" if no response is received. If the response indicated the person is located ("Located") by the Relay Station, the assigned Phone number will be displayed ("Display Phone #") on the screen and the programm exits from the processor. If it cannot be located, or no answer was received after three trials, all Relay Stations are asked to search for the Badge unit, "Transmit Command to All Relay Stations to Turn on Badge Power". The console program first broadcasts Badge Power On message to all Relay Stations, which in turn transmit the Wake Up signal to all badges. Then the program will time out and take action to all Relay Stations dividing into the different groups. In the presently preferred embodiment of FIG. 13A, rather than transmitting a Badge Power On message to all Relay Stations, this task is left to the Relay Stations. The Relay Stations are responsible for sending out a wake-up signal prior to making a Badge interrogation.

The console generates the Badge ID message and transmits it to all group A Relay Stations. "Transmit Badge ID to Group A Relay Stations" After allowing enough delay for the group A Relay station to complete the transmission of the message to the badges, the message address is changed to group B and the group B Relay Stations will be directed to interrogate the badges "Transmit Badge ID to Group B Relay Stations". The sequence is repeated for group C and group D allowing enough delay between each sequence. After group D has completed the ID transmission to the badge, the console transmits the Response Request message to Group A Relay Stations "Ask Group A Relay Stations for Badge Response". If a response is received, "Badge Response", the ID of the responding Relay Station and the time required by the Relay Station to receive the response from the badge are extracted from the identification signal and stored in the memory, "Save Relay Station ID and Response Time". If no response is received ("No Response") from any of the group A Relay stations, the No Response flag is set. The Response Request is repeated separately for Groups B, C and D thus creating separate time periods for each group to provide an identification signal. Since the Relay Stations in any one group do not cover overlapping areas there can be at most one Relay Station in a group which is within range of the acknowledge signal. In the presently preferred embodiment of FIG. 13A, used when communication between the Badges and Relay Stations is limited to infrared, the Control Console does not send a response request. The Relay Stations are programmed to automatically respond to the Control Console after making a Badge inquiry if they receive a response from the Badge. Since each group is asked for a Badge inquiry at a separate time, the identification signals from each group will be transmitted at the corresponding separate time periods to the Control Console. The presently preferred algorithm for the Relay Stations is provided in FIGS. 20 A–E.

After completing the cycle through all of the groups of Relay Stations, the Response from all groups are checked "Check All Response". If no responses are received from any Relay station ("No Response") or the response is not identifiable ("Response Not Identifiable"), the sequence is repeated by returning to AR which begins by broadcasting the Badges Power On message. If one or more responses are received "Response Identified", the most likely location will be calculated according to the Relay locations stored in the memory. The program selects one Relay Station to be nearest to the badge. The phone number assigned to the Relay Station together with the location of the station are displayed on the CRT "Display Nearest Phone #" and the program exists from the paging task processor. If no response can be obtained after 3 trials "3rd Trial", the program will display the listed phone number and a message saying that the person was not located "Display Listed Phone #" and exits from the Paging Task Processor. If the Badge is not located and the system is connected to an automatic switchboard, the incoming call is automatically directed to the appropriate number such as a message desk, recording machine or listed number.

There are may changes and modifications which can be made to this program which add features that enhance the present invention. A variety of different interrogation patterns may be used to refine the procedure for locating the Badge unit. The program could also be modified so that the Badge unit could be located without causing the Badge to emit a chime sound. It would also be possible to make the program self-adapting to the different badges (Ultrasonic or Infrared type).

Relay Station

Hardware Description

The Relay Station is a microcomputer based system with a serial full duplex interface with the Control Console and with the Infrared transmitter and receiver (and/or the Ultrasonic receiver in an alternate preferred embodiment).

The major components of the system are:
1. Microcomputer Unit and ROM (FIG. 14)
2. Infrared and Subcarrier Generator (FIG. 15)
3. Station ID Inputs
4. Infrared transmitter and Power Supply (FIGS. 16 and 18)
5. Infrared Receiver (FIGS. 17 and 28)
6. Carrier Current Transmitter (FIG. 9)
7. Carrier Current Receiver (FIG. 10)
8. Ultrasonic Receiver (FIG. 18)
9. Ultrasonic Decoder (FIG. 19)

1. Microcomputer Unit and ROM (Reference FIG. 14)

The microcomputer unit used in the Relay Station is a medium performance 8-bit computer, preferably an Intel 8031 which has a RAM memory, 2 timers, a serial transmitter and a receiver, and an interrupt controller built in to a single unit. The 8031 is connected to a latch LS373 and a ROM 2716 as shown. The 8031 system clock is provided by an on board crystal-controlled oscillator whose CRYSTAL is connected to the 8031 as shown. The crystal produces an output of 12 MHz.

2. Infrared and Subcarrier Generator (Reference FIG. 15)

A counter comprising SL161's is provided to count down from the crystal controlled oscillator frequency of 12 MHz received from 8031 to obtain the desired frequencies of 39.504 KHz and for the Infrared transmitter of 9876 Hz for the RF SUBCARRIER which is used to frequency modulate the carrier current transmitter.

3. Station ID Inputs (Reference FIG. 15)

There is a set of input gates 1501 (CODE PLUG INTERFACE) to read the Relay Station ID number from the external switches or code plug 1502. This ID is unique to the Relay Station location and any station located at the same position will have the same ID number.

4. Infrared Transmitter and Power Supply (Reference FIGS. 16 and 28)

Figure 16:
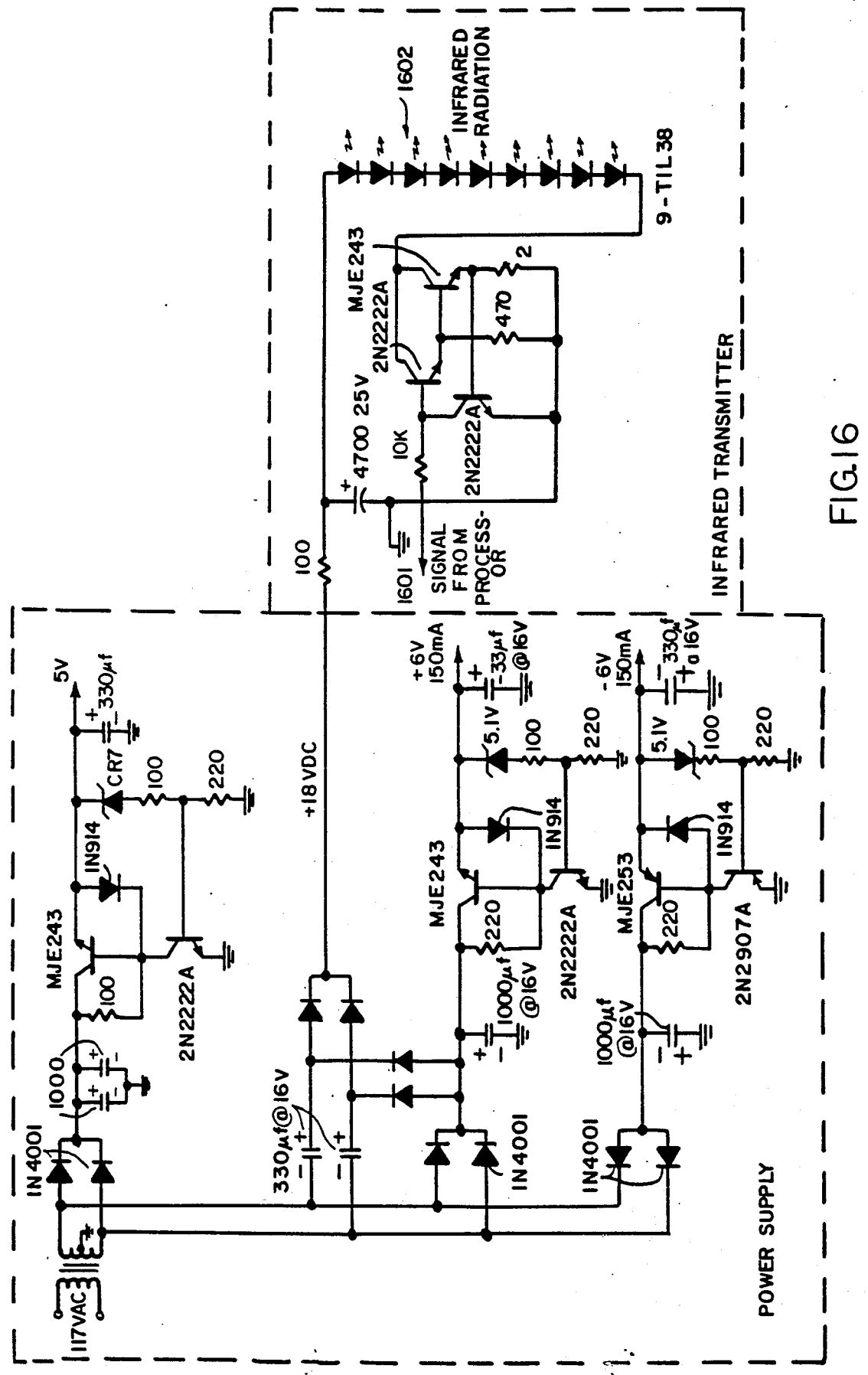
FIG. 16 is a schematic wiring diagram of an infrared transmitter as used at a Relay Station, and includes the power supply for the Relay Station.

The Infrared signals which "wake-up" and then convey information to the Badges are radiated from a Relay Station by the Infrared transmitter shown in schematic form in FIG. 16. Power for operation of this transmitter, as well as all other electronics within the Relay Station is obtained from the Relay Station Power Supply, shown schematically in FIG. 16.

Figure 14:
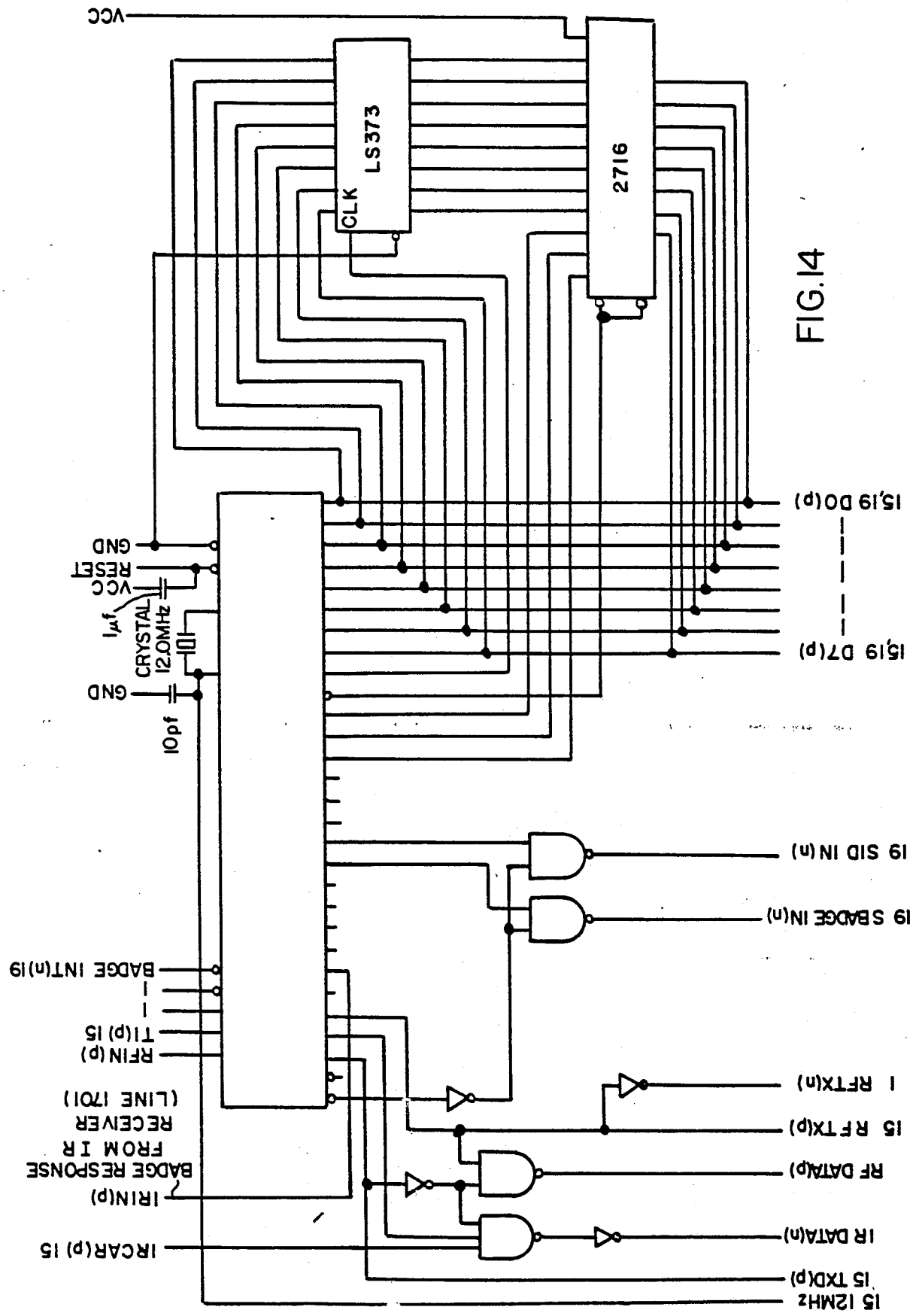
FIGS. 14 and 15 are logic wiring diagrams for the Relay Station.
Figure 15:
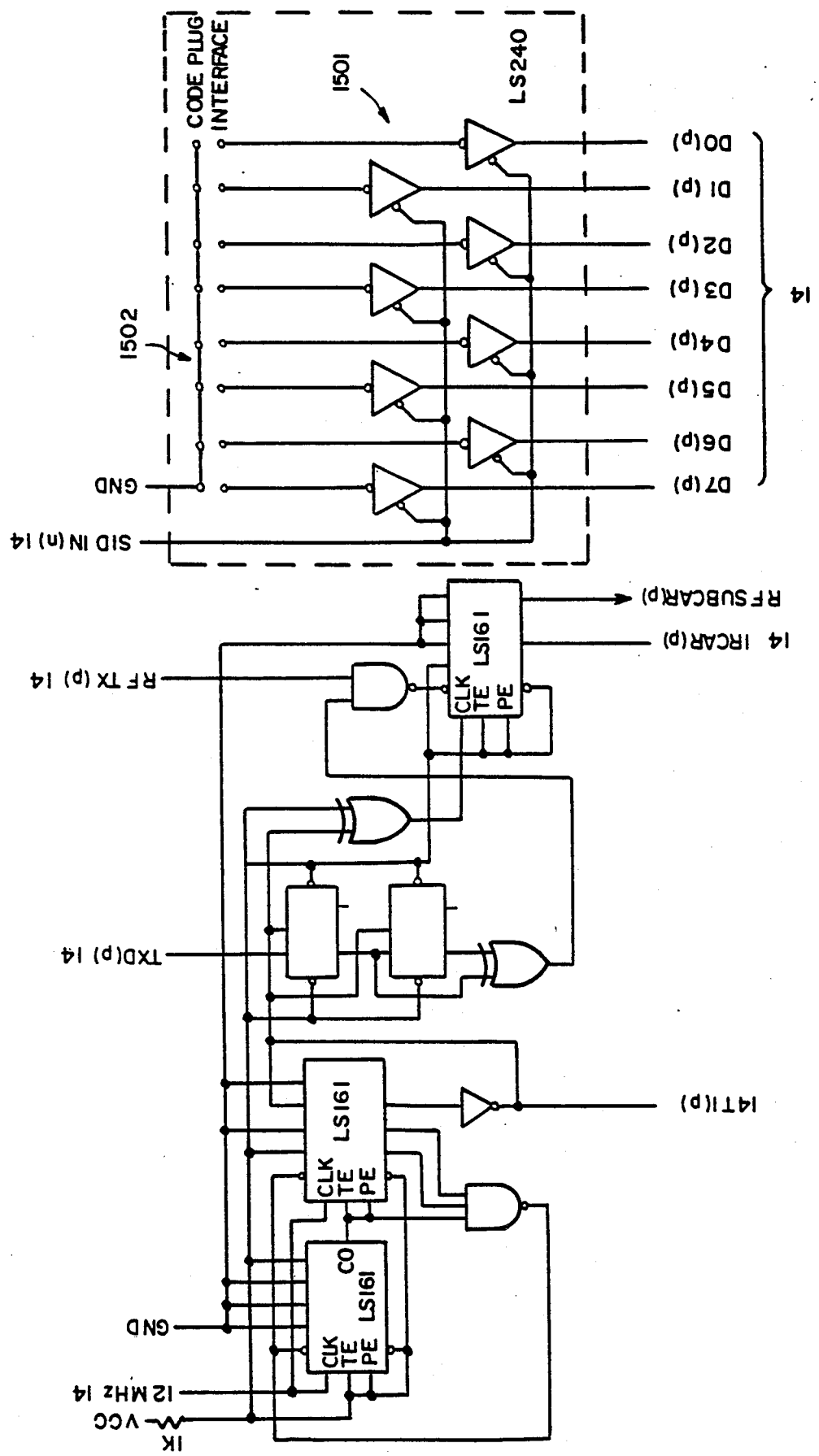

Data signals to be transmitted are supplied on the IR Data line 1601 shown in FIG. 14 to the Relay Station IR transmitter shown in FIG. 16. The data signals are in the form of gated bursts of approximately 40 KHz pulses. In the preferred embodiment, the exact frequency used is 39.504 kHz. Transistors Q7 and Q8 connected in a Darlington configuration, force current through nine IR emitting diodes 1602. A preferred model for the IR emitting diodes is the TIL 38 diodes manufactured by Texas Instruments. The number of diodes is chosen to allow coverage of a hemispherical area by considering the radiation pattern of the particular model of diodes selected and mounting the diodes in a circle on a board at inclined angles to cover the hemisphere.

Sampling resistor R3 and feedback transistor Q9 are used to regulate the magnitude of the diode current pulses. An energy storage capacitor, C5, and decoupling resistor, R1, act to integrate the diode current in order to avoid demanding large peak current levels from the power supply.

Prime power (117 volts rms, 60 Hz, in the preferred embodiment) for power supply operation is stepped down in voltage by transformer T1 (FIG. 16). Three regulated voltage levels, +5VDC, +6VDC and −6VCS are produced by three similar regulator circuits.

After rectification and filtering (CR1–CR6, C1–C4), the resulting voltage levels are regulated by series pass element transistors (Q1, Q3, Q5) under control of feedback loops using reference diodes (CR7–CR9) and shunt control transistors (Q2, Q4, Q6).

Power for operation of the IR transmitter is obtained by a voltage multiplier (C5, C6, CR10–CR13) which adds to the rectified level produced by CR3, CR4. Regulation of the supply voltage for the IR transmitter is not required because the transmitter has an internal current regulation feature, as described.

Figure 28:
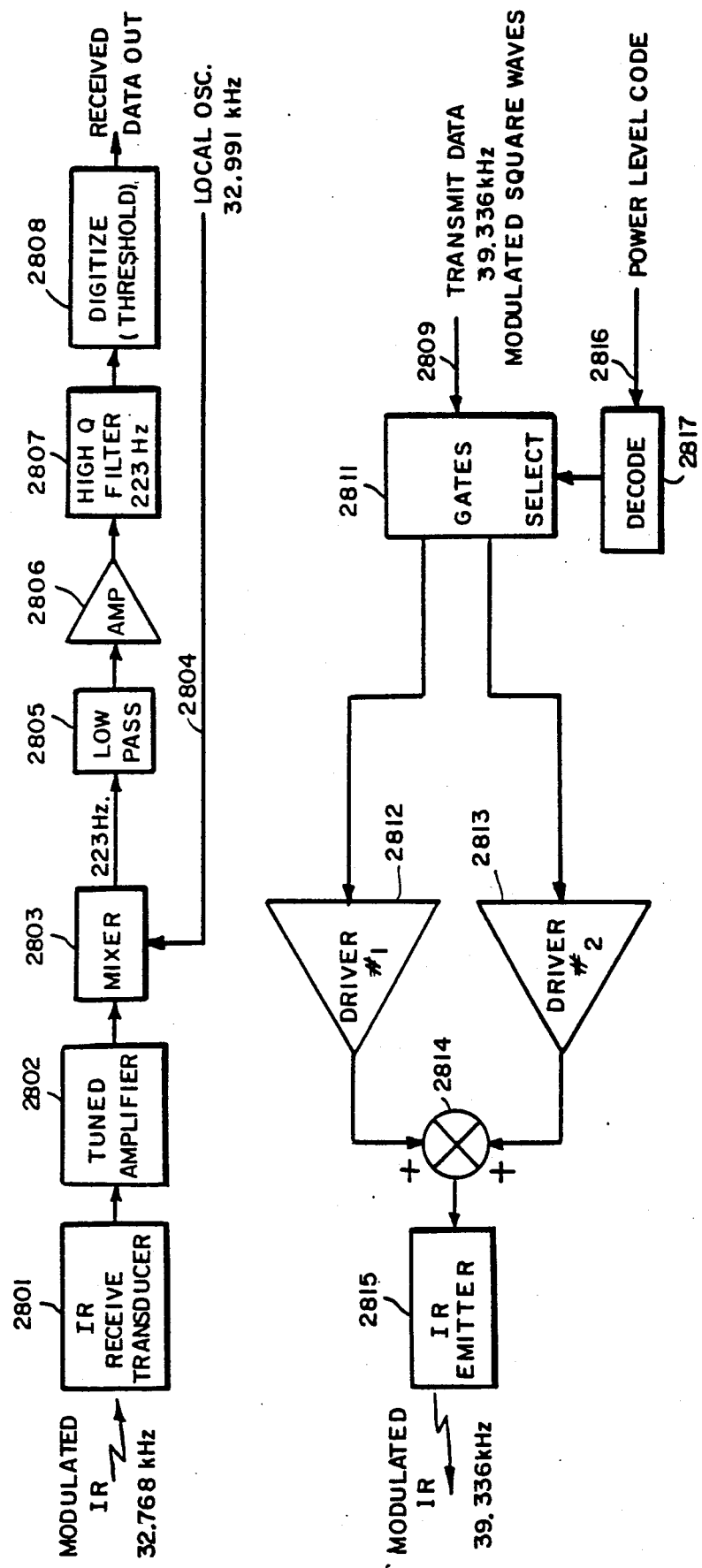
FIG. 28 is a presently preferred embodiment of a Relay Station infrared receiver/transmitter.

Referring now to a presently preferred embodiment of the transmitter circuit shown in a block diagram schematic in FIG. 28, the transmitter circuit is arranged to provide for successive reduction in infrared transmitted power as a way to test the range to a responding Badge. Basically the system drives the infrared emitter at high power and successively reduces the power to determine which Relay Station remains in contact with the responding Badge at the reduced power levels thereby determining which Relay Station is closest or receiving the strongest signal from the responding Badge.

The signal to be transmitted to the Badges arrives on line 2809 and after passing through gates 2811 initially energizes a first driver 2812 and a second driver 2813. When both drivers are energized their power outputs are summed in a summing junction 2814 to supply the sum of the powers to energize an infrared emitter 2815.

To control the output power level of the IR emitter 2815 a power level code signal on line 2816 is applied to a decoding unit 2817. The output of decode unit 2817 selectively de-energizes one driver and then the other driver of the pair of drivers 2812 and 2813, thus the power is transmitted at three different levels represented by both drivers being energized and one or the other of the drivers being energized individually. The drivers 2812 and 2813 do not drive at the same level so that a discrete power level change is obtained by driving first one and then the other of the drivers. In this fashion range selection to the responding Badge can be determined relative to another receiving Relay Station.

5. Infrared Receiver (References FIGS. 17 and 28)

Figure 17:
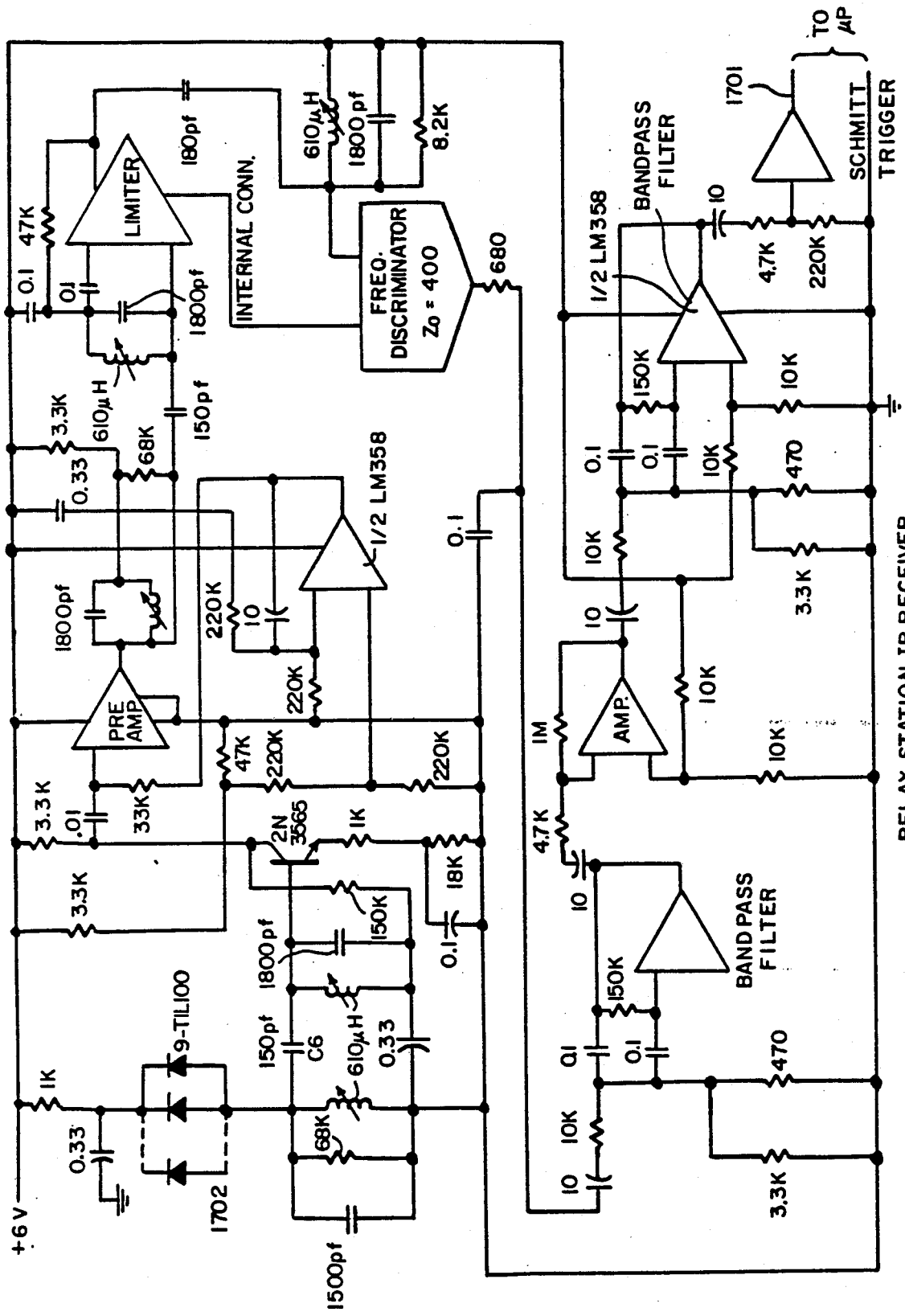
FIG. 17 is a schematic wiring diagram of the Relay Station infrared (IR) receiver.

Reception of an Infrared (IR) signal transmitted from a Badge is the function of the receiver shown schematically in FIG. 17.

A group of IR receiving diodes 1702, preferrably TIL 100 diodes, are arranged to accept IR radiation from Badges within the space monitored by the Relay Station. Typically, the monitored space would extend twenty to fifty feet from the Relay Station, although larger or smaller distances are possible. In a preferred embodiment, nine IR receiving diodes 1702 are used in an array to provide hemispherical coverage. The number of diodes is determined by their radiation acceptance angles.

Current generated by the IR receiving diodes in response to incident IR radiation is applied to a double tuned filter circuit (L1, C1, L2, C2, C6). This filter has a bandpass characteristic centered at 138 kHz with peaks of maximum response at 133.3 kHz and 142.8 kHz. Transistor Q1 is used to provide a high impedance load for the double tuned circuit and to match the input impedance of the preamplifier U1A. An operational amplifier circuit U2A, is used to maintain the preamplifier within its relatively narrow dynamic operating range.

A second double tuned bandpass filter circuit (L3, C3, L4, C4, C7) with 138 kHz center and 133.3 kHz, 142.8 kHz peak frequencies follows the preamplifier and feeds into limiting amplifier U1B. After limiting in LIMITER U1B, the signal is applied both directly and in quadrature (via C8, C5, L5) to a frequency discriminator, U1C. The frequency discriminator extracts the 208 Hz frequency modulation rate from the two inputs. A bandpass 208 Hz filter circuit, which includes amplifier U1D, followed by a high gain amplifier, U2B, and another bandpass 208 Hz filter, this one including amplifier U3, act on the discriminator output to raise the 208 Hz signal level while attenuating noise. Schmitt trigger U1E converts the 208 Hz sinusoidal output from U3 into a pulse train on line 1701 which can be used by the Relay Station processor.

Referring now to FIG. 28, a presently preferred embodiment of the modified circuit for the Relay Station infrared receiver transmitter will be described. The receiver section of FIG. 28 provides super heterodyne type of receiver operation for improved signal performance and the transmitter shown in FIG. 28 provides a different mode of evaluating distances between a Badge and a relay station in communication with a particular Badge at the same time another Relay Station is in communication with that Badge. The receiver portion of FIG. 28 provides the functions and uses the signals previously described with reference to FIG. 17 while the transmitter portion of FIG. 28 is a modification for performing functions similar to those described for the infrared transmitter portion of FIG. 16.

The receiver portion of FIG. 28 operates with an infrared receive transducer 2801, receiving the incoming on/off modulated infrared light signal. The transducer 2801 produces an electric signal at the modulation frequency of 32.768 KHz to a tuned amplifier 2802, the output of which is applied to a mixer 2803. The mixer 2803 receives a local oscillator signal on line 2804 and produces an output different frequency of 223 Hz. The 223 Hz signal passes through a low pass filter 2805 and an amplifier 2806 to supply the input to a high Q filter centered at the 223 Hz frequency. The output of filter 2807 is digitized in threshold circuit 2808 to provide an output "Received Data Out" signal.

6. Carrier Current Transmitter (Reference FIGS. 9 and 26)

Referring to FIG. 9, the design of the Relay Station Carrier Current Transmitter in the preferred embodiment is identical to that of the Control Console Carrier Current Transmitter with the following exceptions:
1. When a logic "1" is transmitted, a 316.032 KHz carrier obtained by retuning the center frequency of FMOSC with a frequency modulated deviation of ±11 KHz is produced.
2. When a logic "0" is transmitted, the 316.032 kHz carrier is not frequency modulated.
3. Components C4, C5, C6, C7 and C8 must be changed to new values in order to retune FMOSC AMPLIFIER to the stated carrier frequency for the Relay Station.

A presently preferred embodiment of the carrier current transmitter is described above in Section 14 of the Control Console Hardware with reference to FIG. 26.

7. Carrier Current Receiver (Reference FIGS. 10 and 26)

Except for some component value and frequency differences, the Relay Station Carrier Current Receiver used in the preferred embodiment is identical to the Control Console Carrier Current Receiver. Referring to FIG. 10, the differences are:
1. The center frequencies of the two double tuned bandpass filters are 474.048 kHz, with peaks of maximum response at 458 kHz and 490 kHz.
2. Components L1, L2, L3, L4, L5 and/or C1, C2, C3, C4, C5, C6, C7 and C8 must be changed in value to achieve these frequency requirements.

A presently preferred embodiment of the carrier current receiver is described above in Section 14 of the Control Console Hardware with reference to FIG. 26.

8. Ultrasonic Receiver (Reference FIG. 18)

Figure 18:
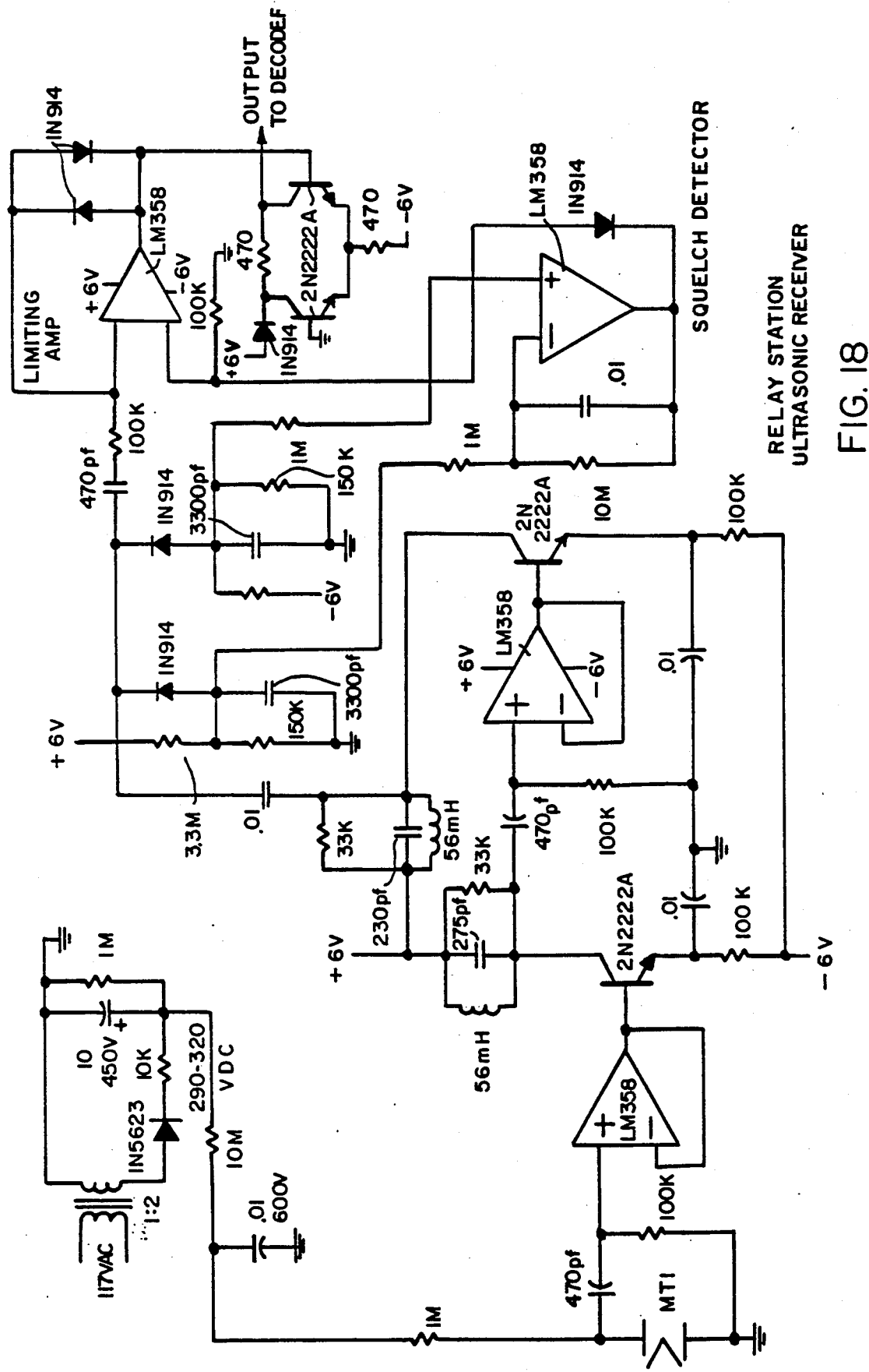
FIG. 18 is a schematic wiring diagram of an ultrasonic receiver for use at a Relay Station in the modification shown in FIG. 3 where the Badge transmits using ultrasonic energy.
Figure 19:
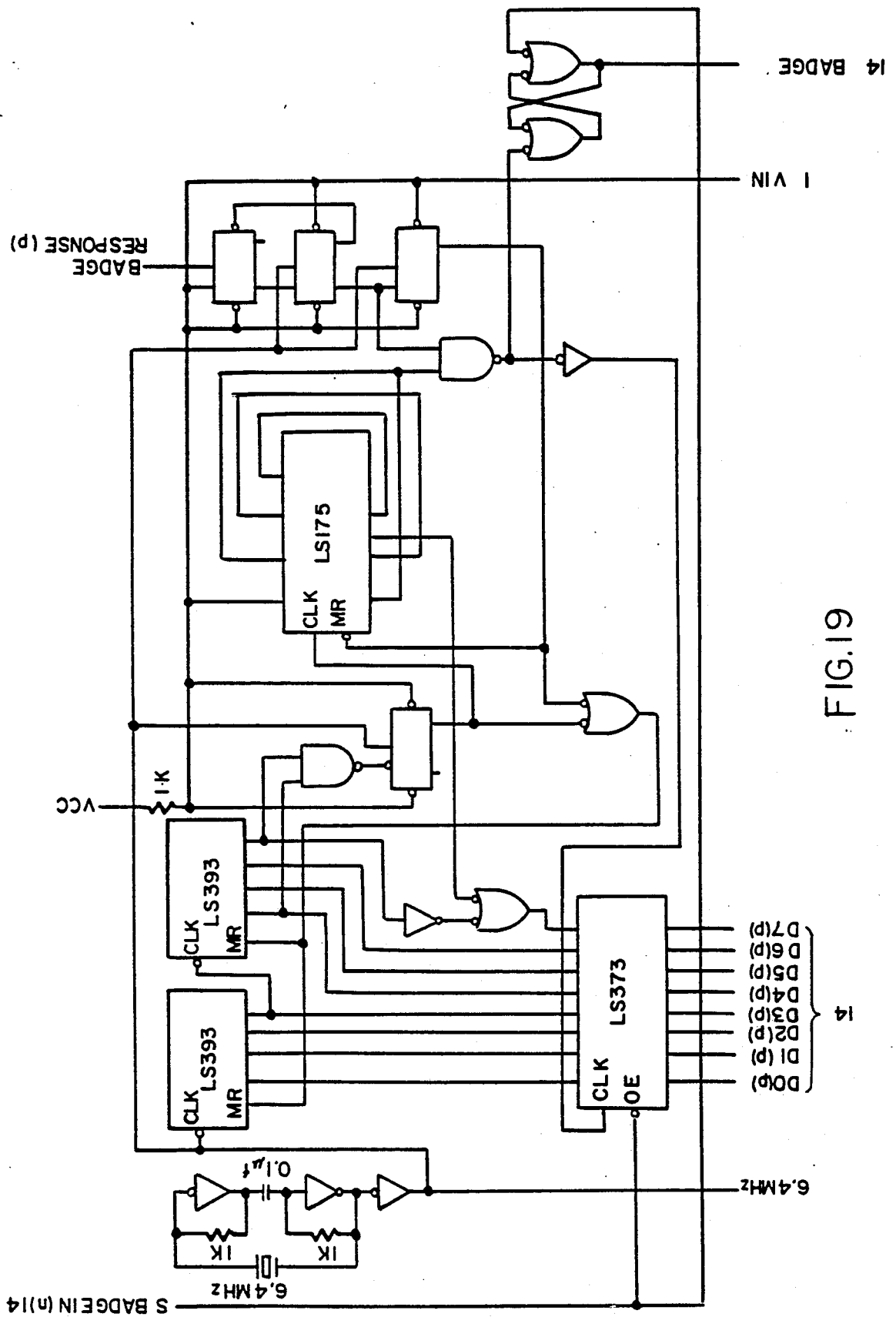
FIG. 19 is a logic wiring diagram of a decoder which would be used with the ultrasonic receiver of FIG. 18.

The schematic diagram of an alternate preferred embodiment in FIG. 3 employs a Relay Station Ultrasonic Receiver as shown in FIG. 18.

Ultrasonic energy impinging on the sensing element MT1 is converted to a signal voltage. A bias potential (290 to 320 VDC) is used to increase the sensitivity of the receiving element which functions somewhat like a capacitor microphone. Two identical stages of amplification follow, with unity gain amplifiers U1A, U1B buffering the signal before application respectively to tuned amplifiers Q1, L1, C1, Q2, L2, C2. By choosing the quality factor (Q) of the tuned circuits (via the values of R1, R2), flat response is obtained from 38 to 42 kHz. This bandwidth allows the receiver to be responsive to the badge transmitted frequencies of 39 and 41 kHz even if they are shifted by as much as ±1 kHz due to Doppler effect when the Badge is moving at speeds up to 17 miles per hour. The same Data is transmitted on a plurality of frequencies (39 and 41 kHz) to avoid nulls (signal cancellation caused by multiple transmit/receive paths) commonly encountered in ultrasonic systems.

A soft limiting circuit (CR1, CR2, R2-R5, C3, C4) is used to prevent overdriving the next stage LIMITING AMP while providing a signal to the squelch detector U2A. In the absence of a strong signal, U2A has a low output, turning off output amplifier U2B, Q3, Q4. Signal levels strong enough to force conduction of CR1, CR2, will remove the squelch drive, and, after the amplifier time constant (R6 C5) has passed, allow the output amplifier to function.

Limiting amplifier U2B drives transistor amplifier Q3, Q4, CR3 to produce logic compatible signal levels for application to the Ultrasonic decoder through the OUTPUT TO DECODER line.

9. Ultrsonic Decoder (Reference FIG. 19)

The OUTPUT TO DECODER of the Ultrasonic receiver FIG. 18 is fed into the BADGE RESPONSE line of the decoder in FIG. 19. The output signal is a digitized pulse train with frequencies varying from 38 kHz to 42 kHz. The decoder circuit FIG. 19 measures each pulse period and reports the variation from 40 kHz (center frequency). The program in the microcomputer (FIG. 14) analyzes (via signals D0 through D7) the pulse train to determine if the signal has uniform frequency format expected in the response signal from the Badge unit. A valid Badge response is reported by the Relay Station to the Control Console when interrogated by the Control Console.

Software (Reference FIG. 20)

The Relay Station software is organized to respond to the Console signal "Enable Console Receiver Interrupt" while it is continuously performing the self-check routine "Self Check" and the security check if activated "Security Check if Activated" at that time. The security check is an option by which specifically designed Badge units may be placed at doorways or windows for monitoring whether they are opened or closed. The security check could be used for a number of other options including checking to see if a visitor carrying a Badge is in a restricted area of the facility.

Figure 20A:
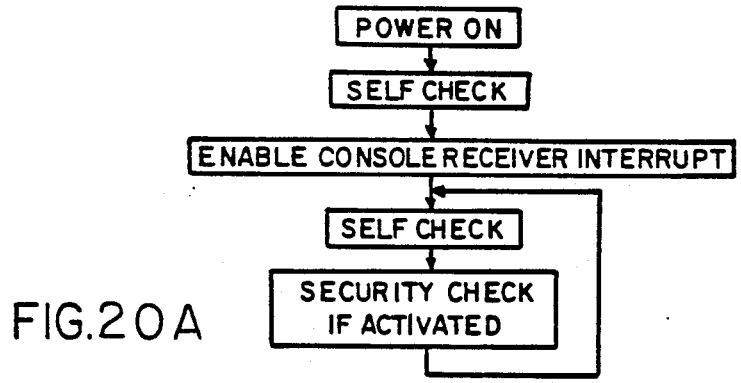
FIGS. 20A-E is a Relay Station flow chart.

Referring now to FIG. 20A, after the power-on initialization, "Power-On", the program will perform Self-Check diagnosis "Self-Check" and will interrogate security devices "Security Check is Activated" until a message from the Control Console is received. The Console message will be addressed to all Relay Stations (broadcast), one of the four groups of Relay Stations (limited broadcast), or a particular Relay Station. The station program decodes the address and decides whether the message is for the station. The message is then decoded and the program will initiate the module with the requested action "Console Message Interrupt". To complete processing of this message without further interrupt from the Console the receiver interrupt is disabled "Disable Receiver Interrupt".

There are six different modules in the Relay Station program. Additional modules may be added to the system without interfering with the existing program.

Figure 20B:
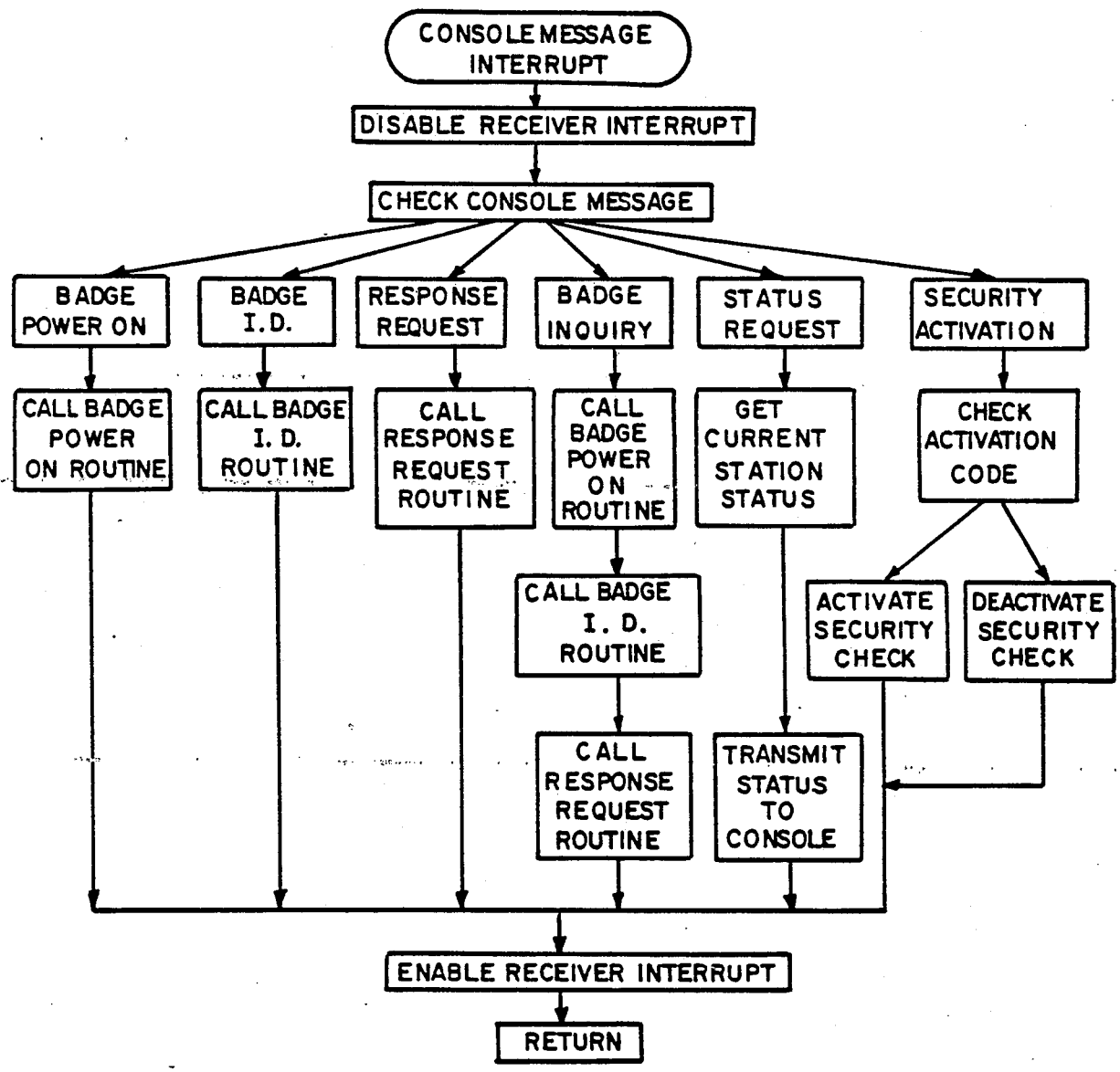
Figure 20C:
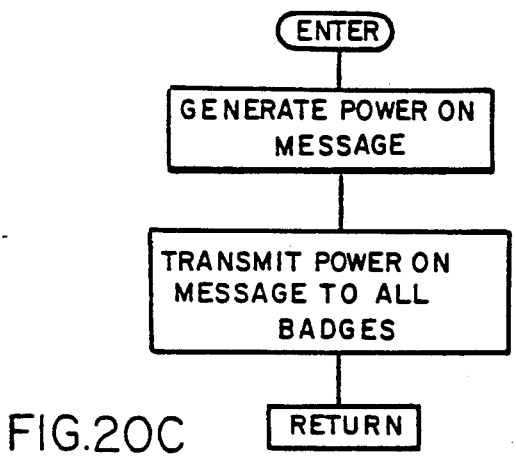

The modules for the program of the presently preferred embodiment are:

1. "Badge Power-On" Program (FIG. 20C)

This program generates the power-on signal for all the Badge units.

Figure 20D:
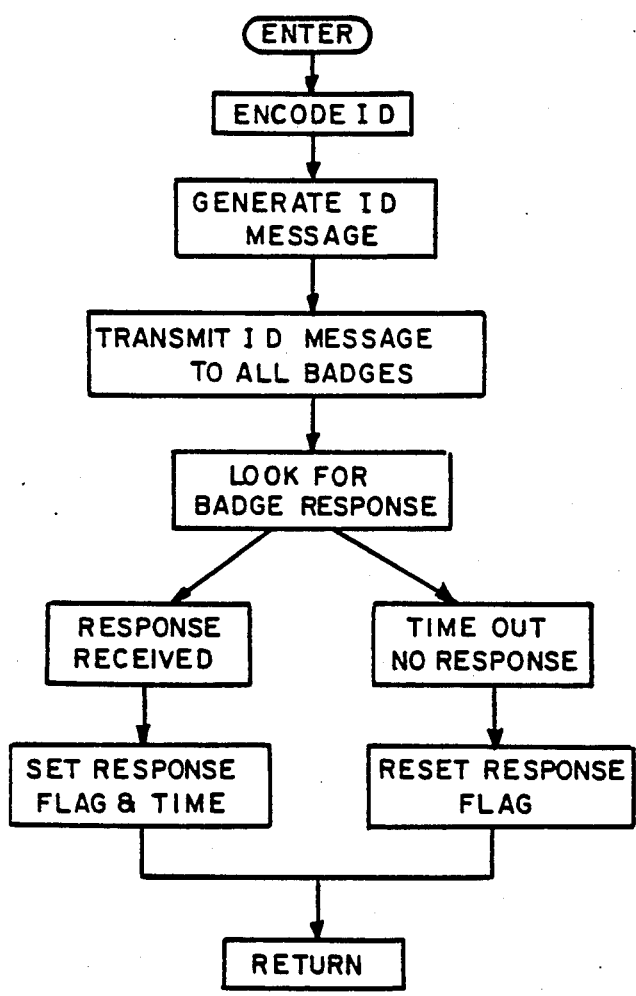

2. "Badge ID" Program (FIG. 20D)

This program encodes "Encode ID" the Badge ID code received from the Console to the form compatible with the Badge unit and assembles the code into a message, "Generate ID Message". The message is then transmitted in the inquiry signal to all the Badge units "Transmit ID Message to all Badges". Then the Infrared or the Ultrasonic receiver is selected based upon the ID code and the program waits for the Badge response "Look for Badge Response". If the response is received in the predetermined time period "Response Received", the response flag wil be set together with the time it took to receive the response from the Badge. ("Set Response Flag & Time") Time is not measured when using an Infrared response, therefore the time is set to 0. If no response is received during this time, "Time Out No Response", the response flag is reset, "Reset Response Flag". Then the program returns to the calling routine.

Figure 20E:
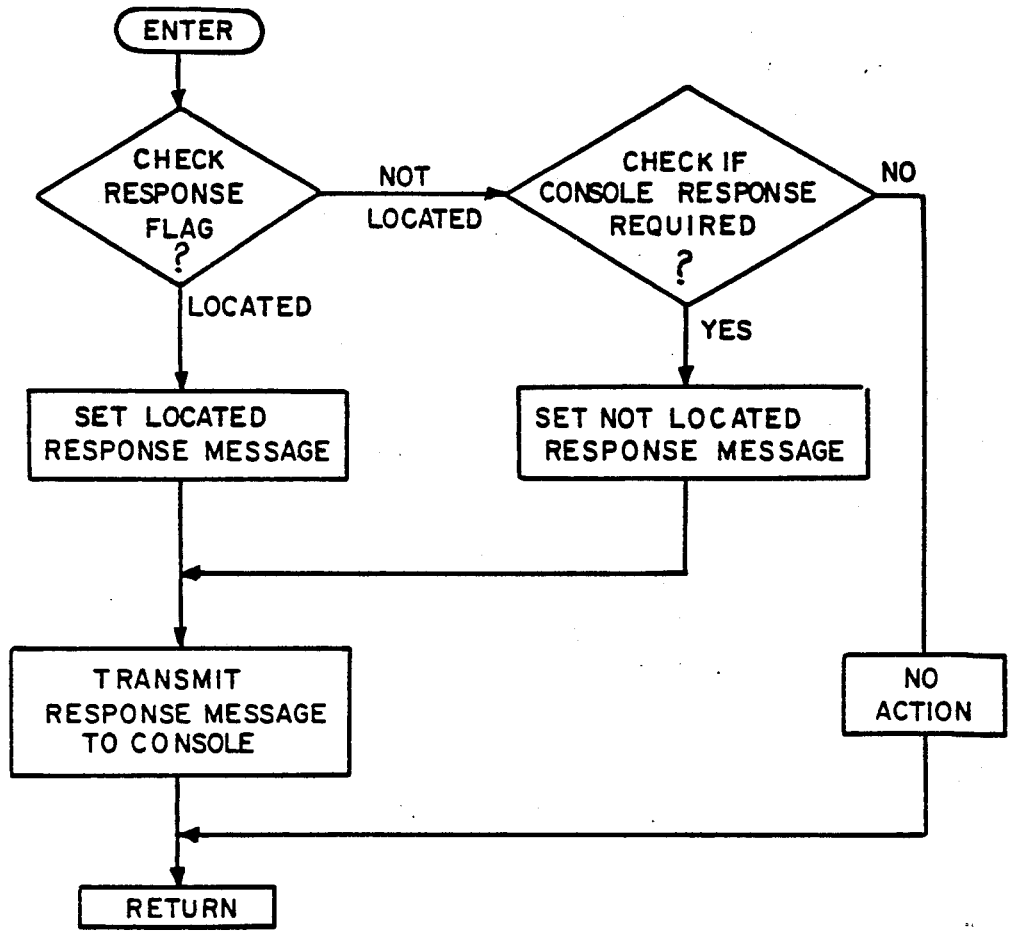

3. "Response Request" Program (FIG. 20E)

This program checks the response flag "Check Response Flag" and if an acknowledgment signal was received from the Badge it will "Set Located Response Message". After response message is set, the program will "Transmit Response Message to Console" in which an identification signal identifying the sending relay station and indicating that an acknowledgment signal was received is sent to the Console. If the Badge was not located, the program will "Check if Console Response Required". If a response is not required, "No Action" is taken and the program returns to the calling program routine. Otherwise, the program will "Set Not Located Response Message". A signal will then be transmitted to the Console indicating that an acknowledgment signal has not been received. The program returns to the calling routine after a signal is sent to the Console.

4. "Badge Inquire" Program (FIG. 20B)

This program calls all three programs above and executes them in sequence. By providing the Relay Station with processing capability, the central station is relieved of the duty of requesting each of these programs. The present invention enables the central station to make a single request which will cause the Relay Stations to power on the Badges, make a Badge Inquiry and provide a response to the central station if the Badge was located.

5. "Status Request" Program (FIG. 20B)

This program looks for current station status information available in the memory, "Get Current Station Status", and transmits it back to the Console "Transmit Status to Console". The current status information would include such things as whether the station is on or off, whether the Badge was found and whether within the range of the Relay Station all of the security spots are unalerted.

6. "Security Activation" Program (FIG. 20B)

This program looks at the code received from the Console "Check Activation Code" and activates or deactivates the security program "Activate Security Check"; "Deactivate Security Check". It may activate for limited area, time, etc.

Badge Unit

Hardware Description

The Badge transmitter-receiver unit contains a microcomputer, an Infrared receiver, and an Infrared transmitter and/or an Ultrasonic transmitter.

Figure 21:
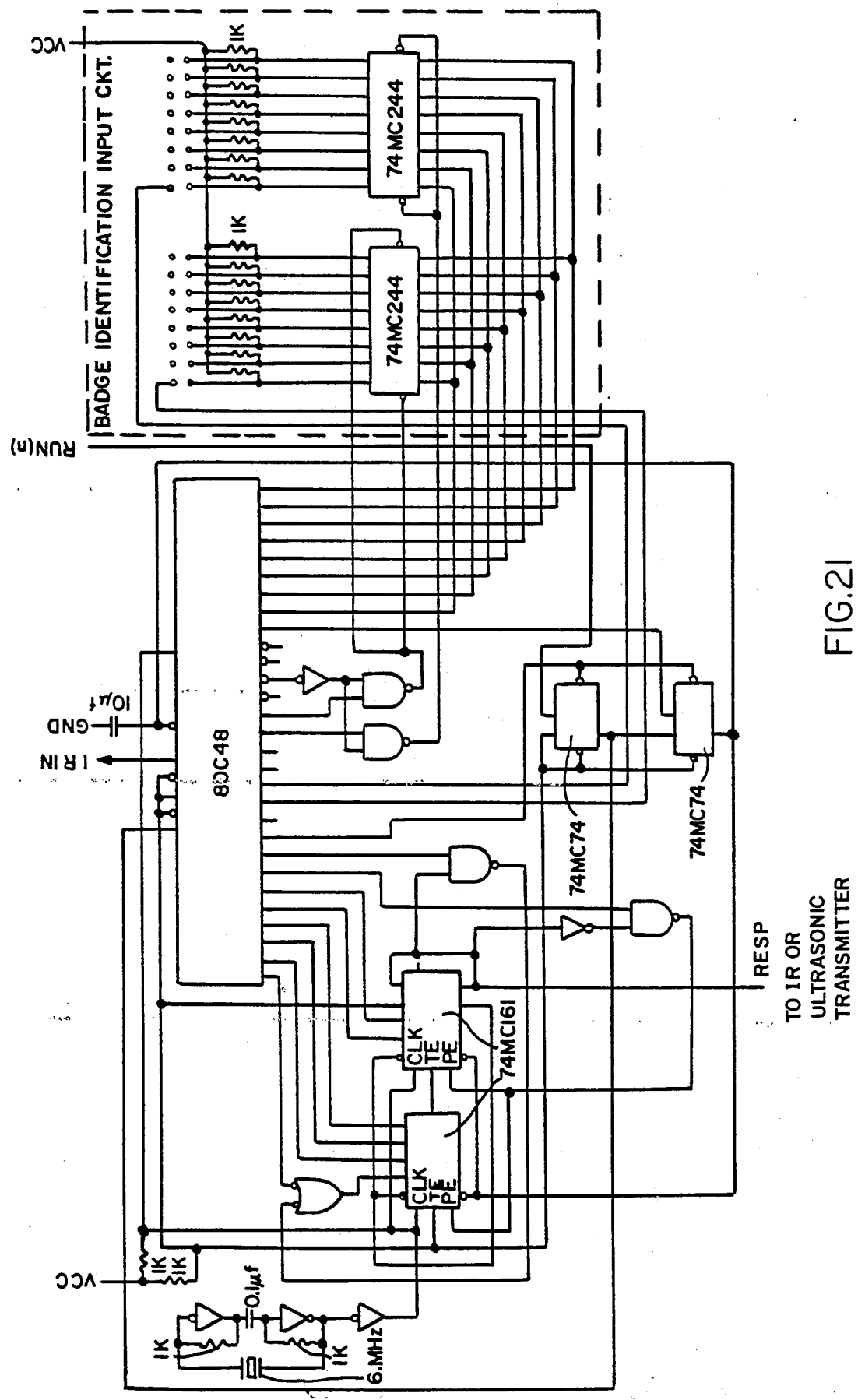
FIG. 21 is a Badge unit logic diagram.

The major components of the system are:
1. Microcomputer Unit (FIG. 21)
2. Infrared Receiver (FIG. 22)
3a. Infrared Transmitter (FIG. 23)
3b. Ultrasonic Transmitter (FIG. 24)
4. Infrared/Ultrasonic Frequency Generator

1. Microcomputer System (Reference FIG. 21) Intel 80 C48

The microcomputer unit 80 C48 with the response frequency generator U4 and U5 decodes and generates a response signal RESP when the Badge unit is addressed. The unit also generates audio signals to alert the bearer of the Badge if it is commanded to do so by the Relay Station.

The microcomputer contains all the required components to perform as a computer including a RAM, a ROM, 2 timers, an interrupt controller and 27 I/O ports. Sixteen input ports are used for identifying the Badge unit which is preset at the time of assembly and is unique to every individual unit. The other ports are used for controlling the response frequency and transmission time.

Figure 22:
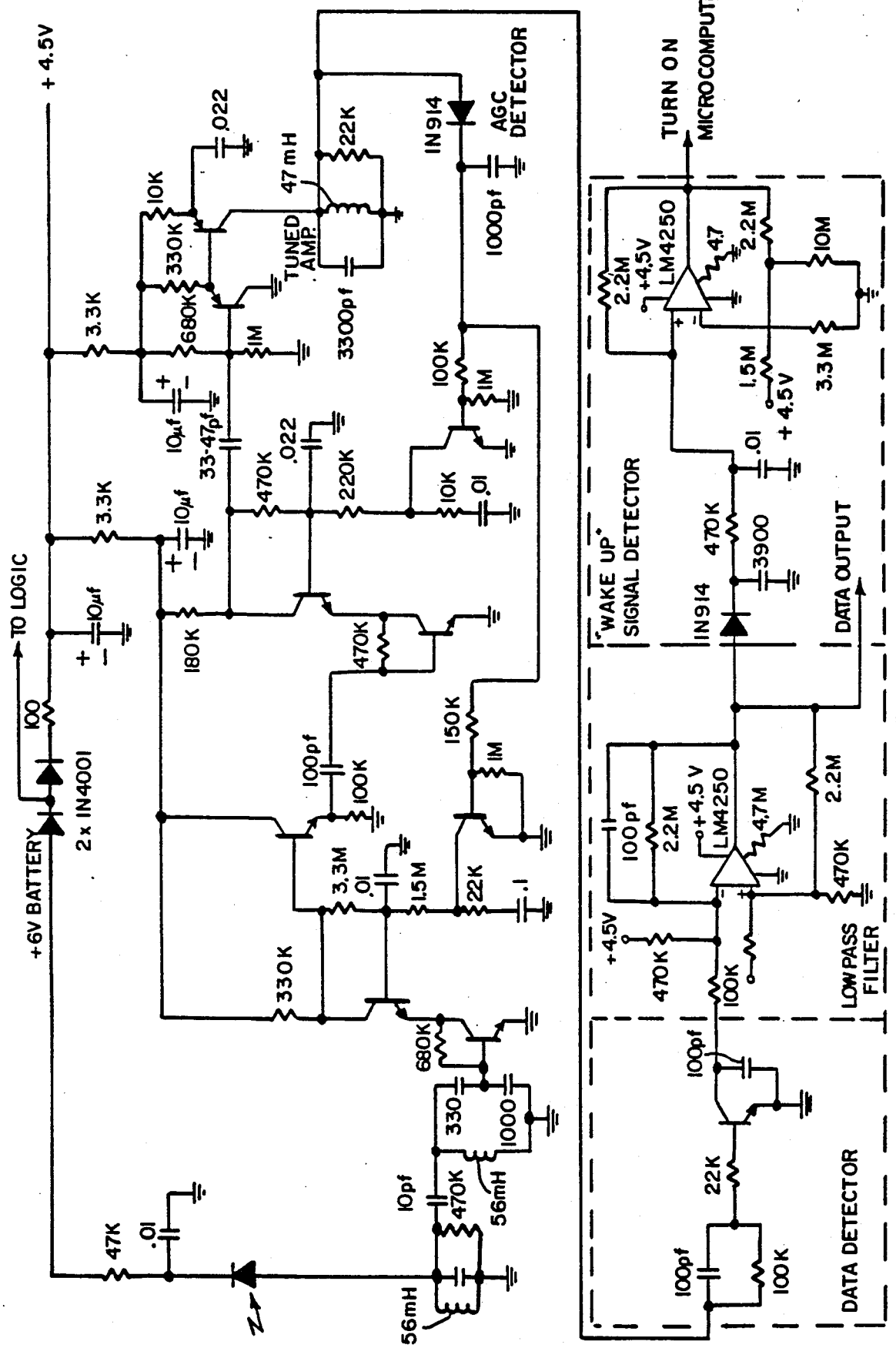
FIG. 22 is a schematic circuit diagram for an infrared receiver as used in the Badge.
Figure 23:
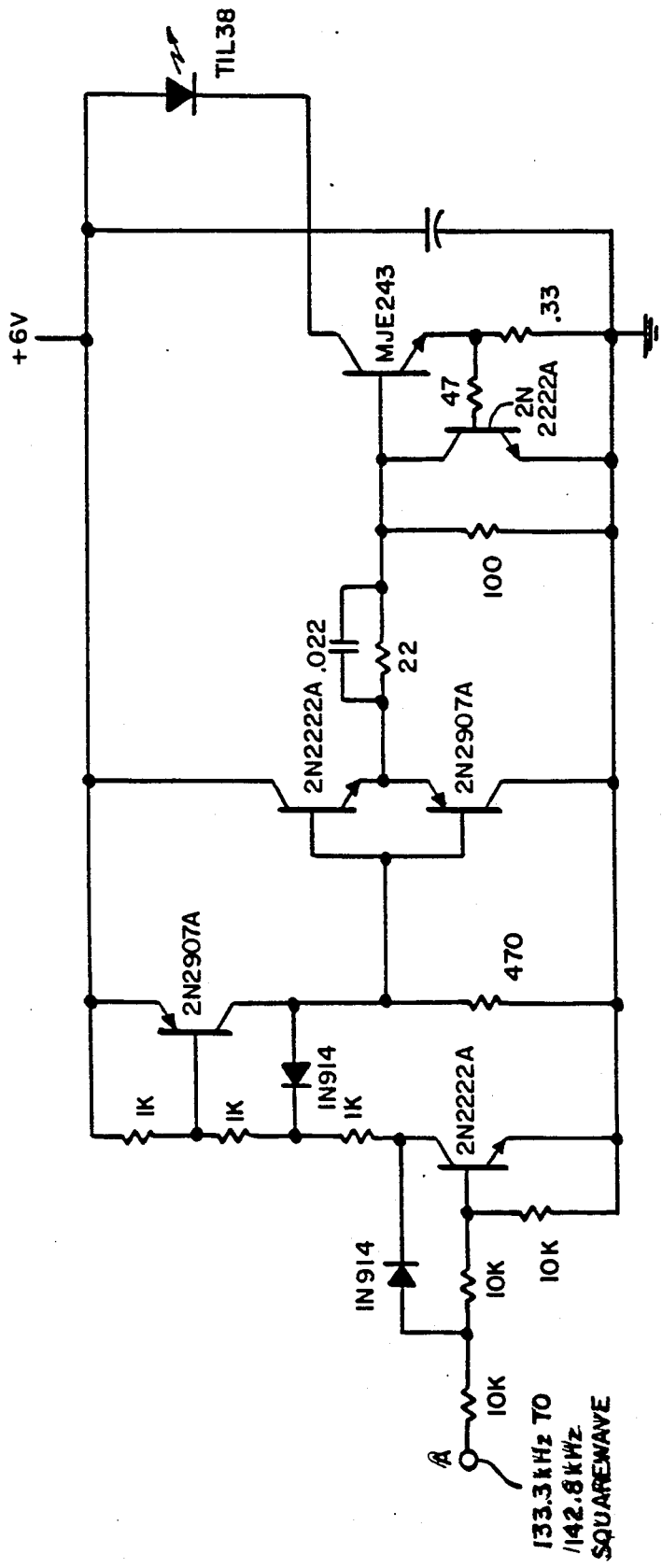
FIG. 23 is a schematic circuit diagram for a Badge infrared transmitter.
Figure 27:
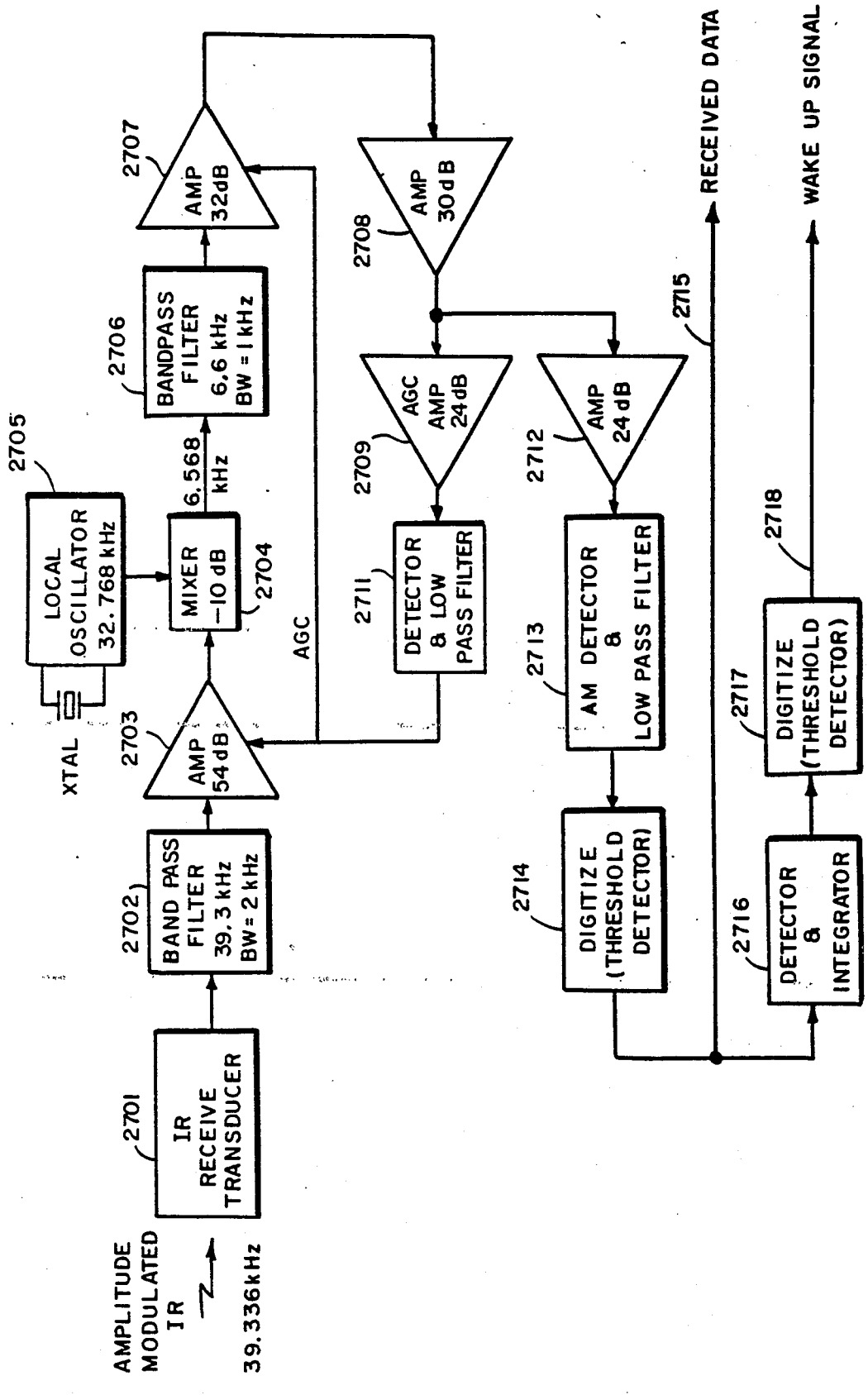
FIG. 27 is a presently preferred embodiment of a Badge infrared receiver.

2. Infrared Receiver (FIG. 22 and FIG. 27)

Infrared transmission from the Relay Stations are received by the Badge IR receiver at diode CR1 which may be a Texas Instruments TIL100. A preferred embodiment of this receiver in schematic form is shown in FIG. 22. Because the receiver is continuous load to the Badge battery, it has been designed for low power consumption.

An IR receiving diode, CR1, converts incident IR energy into current which is applied to a double tuned bandpass filter (L1, L2, C1, C2, C3, C4). In this embodiment, the filter center frequency is 39.5 kHz with peaks of maximum response at 38.8 kHz and 40.2 kHz. Following the filter, a cascode amplifier (U1A, U1B) and emitter follower stage (U1D) provide gain and an impedance level change. A second cascode stage (U2A, U2B) increases the gain further and drives a tuned amplifier (U2C, U2D, L3, C5).

Automatic gain control of the first two amplifier stages is accomplished by detecting in diode CR2 the output from the tuned amplifier U2D (via CR2, C6) and using the resulting voltage level to control drive to transistors U1C and U1E. These transistors modify the bias current, and thus the transistor transconductance and therefore the gain of the two cascode amplifier stages.

The output of the tuned amplifier is also applied to transistor detector U2E. Low pass filtering of this detected signal, via C7 and integrator U3, R1, C10 extracts the envelope (data) from the carrier. U3 provides digital data output on line DATA OUTPUT which returns to IR IN in FIG. 21. Peak detection and additional integration and amplification of the data (CR3, R2, C88, C9, U4) is used to detect the "wake up" command (15 cycles of a 617.25 Hz squarewave 100% amplitude modulation of the 39.5 kHz IR carrier) sent by the Relay Stations. A "wake up" command turns on the Badge microcomputer and allows the subsequently transmitted Badge identification code in the inquiry signal to be examined by the microcomputer to determine if the code matches the identification code to which the Badge was programmed to respond.

Referring now to FIG. 27, a presently preferred embodiment of the Badge IR receiver will be described. The circuit of FIG. 27 is an alternate for the circuit described with reference to FIG. 22, and operates generally with the same input and output. FIG. 27 shows a superheterodyne receiver type circuit which provides improved sensitivity.

The modulated infrared signal is received on an IR receive transducer 2701 which converts the incoming IR signal to an electrical signal which is applied to band pass filter 2702 having a center frequency at 39.3 KHz with band width of 2 KHz. Filter 2702 thus passes an output signal which is modulated on and off at the 39.3 KHz rate to represent the binary data. This signal is applied to a 54 db amplifier 2703 which supplies one input to a mixer 2704. The other input to mixer 2704 comes from a crystal controlled local oscillator 2705 operating at a frequency to provide a 6.568 KHz intermediate frequency output. This signal passes through band pass filter 2706 and amplifier 2707 and 2708 to supply the signal from which an AGC control is developed through AGC amplifier 2709 and detector and low pass filter 2711. The output of AGC detector 2711 and/or pass filter is applied to control the gain in the amplifier 2703 and 2707.

The output of amplifier 2708 is further amplified in amplifier 2712, the output of which is amplitude detected in detector and low pass filter unit 2713. The detected output of low pass filter in 2713 is applied to a threshold detector 2714 which digitizes the data and applies the digital output signal on received data line 2715. The digitized output is also applied to detector and integrator 2716 and a second threshold detector 2717 to provide the wake up signal on line 2718. The detector and integrator 2716 operates as a peak detector to produce a wake up signal on line 2718 only when a sufficient amplitude signal has been received for a sufficient length of time, which parameters are selected to assure that the system wakes up on a true signal rather than on spurious signals.

The receiver circuit of FIG. 27 represents the portion of the Badge which is energized at all times in order to be ready to receive and initiate the appropriate responses when signals are present. For this reason all of the units in FIG. 27 are designed to be the lowest practical current consumption in order to conserve battery life in the Badge unit. By virtue of the wake up signal feature the remainder of the circuits in the Badge unit are placed in a zero current consumption condition or at the minimum leakage current in order to provide the longest possible life for the Badge battery. The circuit of FIG. 27 thus operates with and performs the functions as previously described with respect to IR Badge receiver circuit shown in FIG. 22.

3a. Infrared Transmitter (Reference FIG. 23)

The Badge Infrared (IR) transmitter produces a quasi-frequency modulated high intensity infrared signal controlled by the Badge processor. When no transmission is desired, the processor signal RESP holds the signal level at the transmitter input port low (logic "0" level).

In a preferred embodment (FIG. 23), a logic signal level transmission sequence RESP applied to input port A by the processor would consist of ten repetitions of a cycle made up of a 2 millisecond burst of a 133.3 kHz squarewave followed by a 402 microsecond dead time (logic "0"), followed by a 2 millisecond burst of a 142.8 kHz squarewave, followed by another 402 microsecond dead time. Alternating between the two frequencies (133.3 kHz, 142.8 kHz) at a 208 Hz rate results in a waveform that is similar to a 138.1 kHz carrier, frequency modulated by a 208 Hz signal with a ±4.75 kHz frequency deviation. But, in fact, there is no carrier. Ten cycles of the 208 Hz signal produce a total transmission time of approximately 48 ms.

When the signal level at port A is high (logic "1"), as during one of the 133.3 KHz or 142.8 KHz pulses, transistors Q1, Q2 and Q3 are turned on, which causes power transistor Q5 to draw a 2 ampere current level through transmitter diode CR1. Transistor Q1 acts as a buffer amplifier, while Q2 and Q3 are used for voltage and current amplification in order to provide drive to Q5. A current sampling resistor, R1, is used to control the conduction level of transistor Q6, and thus provides a means for shunting away excessive base drive from Q5. This closed negative feedback path determines the current level (2 amperes) which will be drawn by Q5 through CR1. When the signal at port A drops to a low level (logic "0"), transistors Q1 and Q2 turn off quickly because they were clamped out of saturation by diodes CR2, CR3 in order to minimize storage time. Transistor Q4 turns on with the base drive providd through R2, halting conduction of Q5 and CR1. Capacitor C1 provides local energy storage.

Infrared light is produced by CR1, a Gallium Arsenide Infrared Light Emitting Diode such as Texas Instruments type TIL 38. Although the preferred embodiment uses a diode which emits non-coherent infrared light, higher peak output power levels could easily be obtained using an Infrared laser diode to produce coherent radiation with much higher efficiency.

In a presently preferred embodiment of the badge IR transmitter, a 32.768 KHz square wave signal is taken from the badge crystal controlled receiver local oscillator 2705 as shown in FIG. 27. To transmit this signal is gated on for 56 miliseconds by the microprocessor. The resulting burst of 3212.768 KHz square waves is applied to the input PORT A of FIG. 23 and thus produces a burst of IR radiation modulated by 32.768 KHz square waves.

3b. Ultrasonic Transmitter (Reference FIG. 24)

Figure 24:
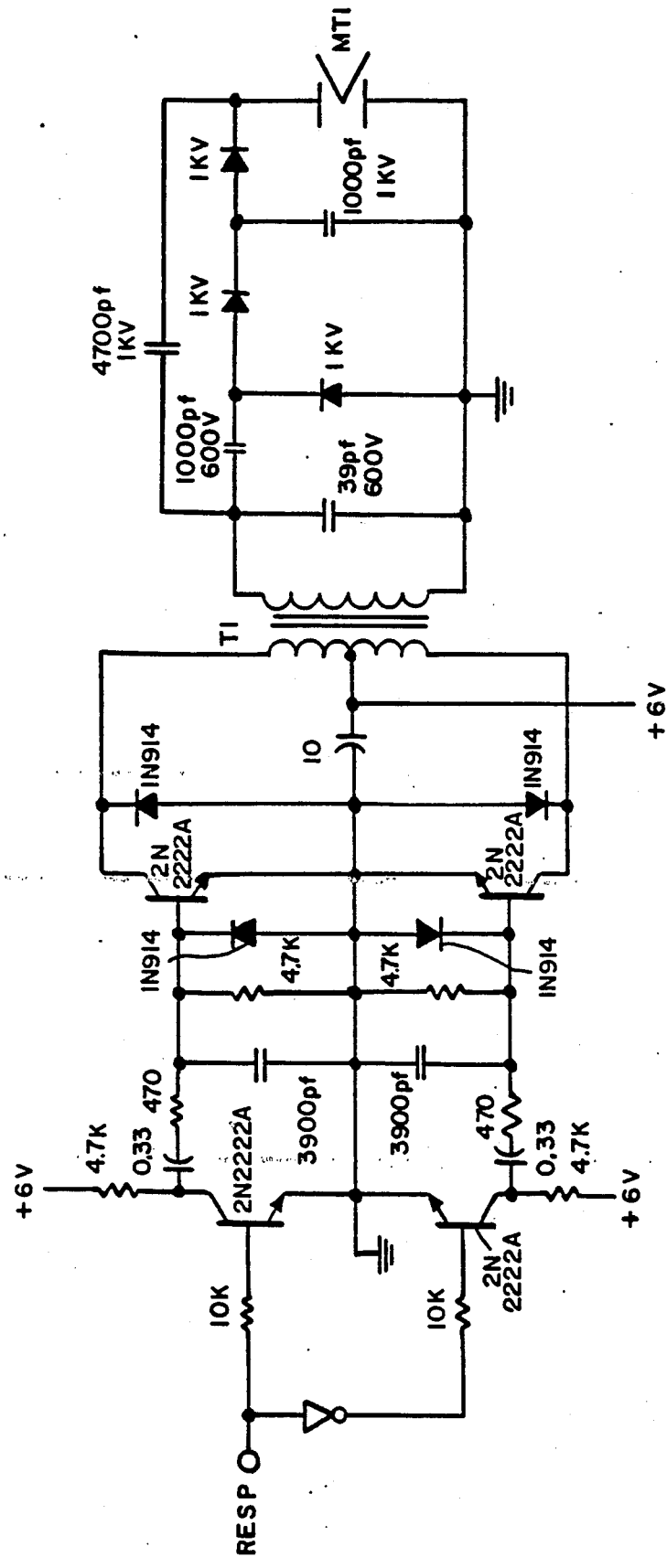
FIG. 24 is a schematic circuit diagram for a Badge ultrasonic transmitter.

FIG. 24 shows the schematic of a preferred embodiment of the Badge Ultrasonic Transmitter. This design operates from squarewave signals produced by the Badge microcomputer as response RESP output in FIG. 21. This signal consists of 39 kHz squarewaves followed by a 50 ms dead time followed by a 50 ms burst of 41 kHz squarewaves.

The RESP signal applies the bursts of squarewave frequencies of 39 to 41 kHz at the input to a phase splitter and thus to pulse amplifier transistors Q1, Q2. A set of driver transistors (Q3, Q4) follow and act with step-up transformer T1 to form a push-pull squarewave power amplifier. Capacitor C1 provides midband tuning at approximately 40 kHz.

A conventional voltage multiplier circuit (C2, C3, CR1, CR2) develops a bias potential of approximately 340VDC from the signal for efficient operation of the wideband Ultrasonic output transducer, MT1. Coupling capacitor C4 and blocking diode CR3 allow the 170 volt peak-to-peak output of T1 to be added to the bias potential.

4. Infrared/Ultrasonic Frequency Generator (Shown to the left of the Badge Identification Input Circuit in FIG. 21)

The Badge unit may have either an Infrared or an Ultrasonic radiation signal generator. The generator circuit for controlling the transmitted signals is a programmable frequency counter which is controlled by the microcomputer. The computer sets up the required frequencies and controls the generation of the response based upon the transmitter circuit built into the Badge unit.

Figure 25:
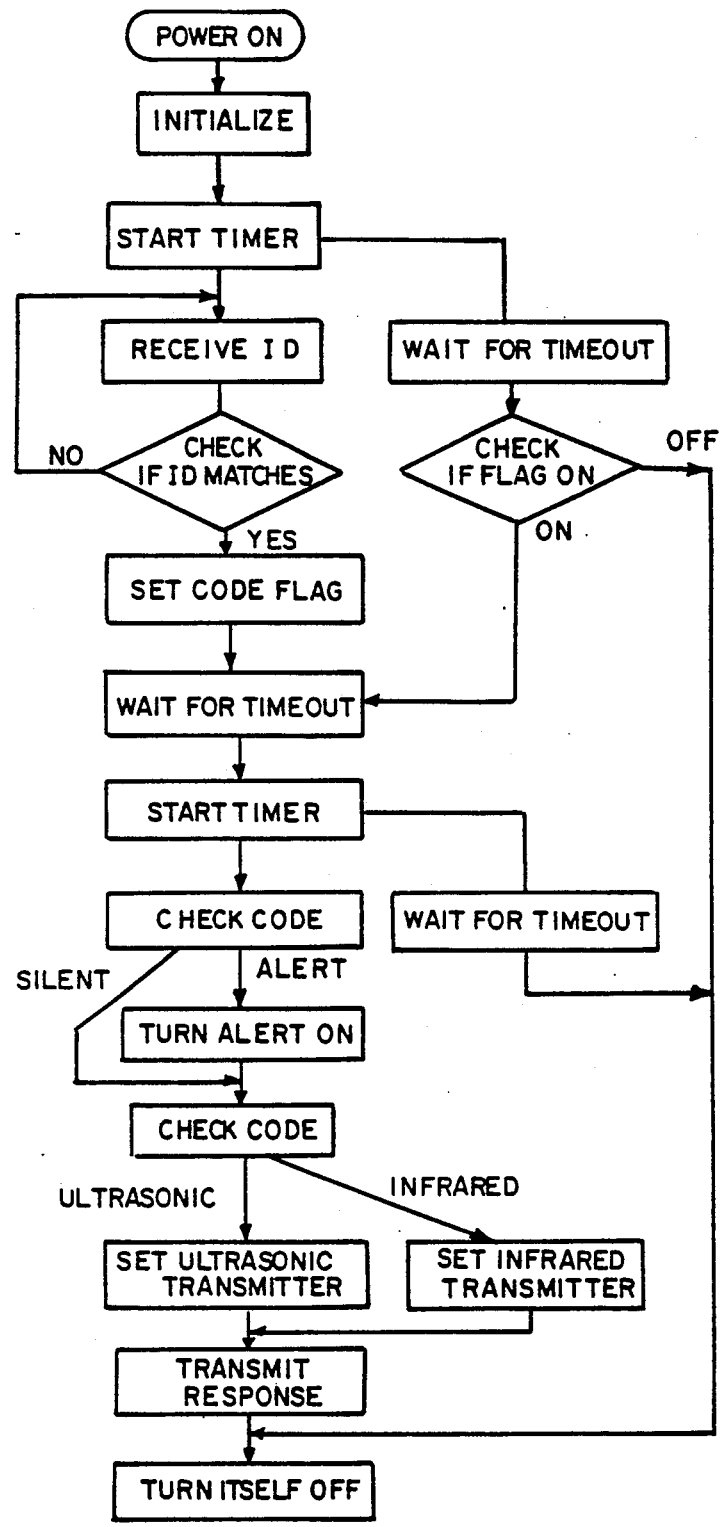
FIG. 25 is a flow chart for the Badge unit microcomputer.

Software Description (Reference FIG. 25)

The Badge unit is normally held reset when it is not active. The program starts when the reset signal is removed and resets itself when the program is completed or the preset time elapses. The program, after initialization "Initialize", starts the timer "Start Timer" and looks for the inquiry signal "Receive ID" from the Relay Stations. If the an inquiry signal with the Badge ID is not received "Check if ID Matches: No" before the timer overflows "Wait for Time out", the program will reset itself and become inactive "Turn Itself Off". After a matching ID is received, the program waits for the timer overflow and restarts the timer. First, information in the inquiry signal is checked "Check Code" to determine whether or not the alert is to be turned on, "Turn Alert On", which enables the emission of a sound. Then the inquiry signal is checked "Check Code" to determine whether the Infrared "Set Infrared Transmitter" or the Ultrsonic transmitter "Set Ultrasonic Transmitter" is to be used. With the proper transmitter set-up, the response signal is generated by the program "Transmit Response" and it resets itself after the transmission is completed "Turns Itself Off". If for any reason the program does not run its course, the timer will overflow and reset itself so that the unit will return to an inactive state "Wait for Timeout"; "Turn Itself Off".

Of course, it should be understood that various changes and modifications to the preferred embodiments described above will be apparent to those skilled in the art. For example, the relay stations may be divided into other than four groups. It will also be possible to use variations on the preferred programs for the control console, relay stations and badges and to still maintain the same functions. These and other changes can be made without departing from the spirit and the scope of the invention and without diminishing its attending advantages. It is therefore intended that such changes and modifications be covered by the following claims.

We claim:

1. The method of determining the present location of a member of a defined class of individual units the present location of which is not known from among a large population of individual units, each programmed to respond to a predetermined inquiry signal, which are normally distributed throughout a defined facility comprising the steps of:

receiving at a central station a request to establish the present location of one of said individual units;

establishing a two-way communication channel between said central station and a plurality of spaced relay stations, each relay station including a transmitter and a receiver and said relay stations being located so as to be cumulatively capable of substantially covering said facility with infrared energy;

communicating by a message coded for selecting said one individual unit over said channel with said plurality of relay stations;

causing said relay stations to transmit an inquiry signal by said infrared energy and enabling the receiver of said one or more relay stations for a predetermined time period following each such transmission;

receiving the inquiry signal at each of said individual units that is located within the coverage of said one or more relay stations;

transmitting a radiant energy acknowledgment signal from any individual unit which recognizes the inquiry signal received from a relay station to be the coded message to which it is programmed to respond;

receiving said acknowledgment signal at any of said relay stations within range of the radiant energy acknowledgment signal transmission;

transitting to said central station over said channel from any relay station which receives said acknowledgment signal an identification signal which identifies that relay station; and utilizing at said central station any identification signal received from a relay station to determine the location of said relay station and hence the approximate location of the individual unit which transmitted said acknowledgment signal, said utilizing including, if more than one identification signal is received, repeating transmission of said inquiry signal at reduced signal level by any relay stations which responds with an identification signal to identify the relay station responsive to the lowest signal level.

2. The method of claim 1 wherein said radiant energy acknowledgment signal comprises an infrared acknowledgment signal.

3. The method of claim 1 wherein said radiant energy acknowledgment signal comprises an ultrasonic acknowledgment signal.

4. The method of claim 3 wherein said ultrasonic acknowledgment signal is transmitted on a plurality of frequencies.

5. The method of claim 3 wherein signals include data corresponding to the amount of time which elapsed between transmission of the inquiry signal and reception of the acknowledgment signal.

6. The method of claim 1 wherein said inquiry signal contains information to indicate whether the emission of a sound is desired and further comprising the step of emitting a sound from any individual unit which recognizes the inquiry signal received from a relay station to be a signal to which it is programmed to respond and which indicates that the emission of a sound is desired.

7. The method of determining the present location of a member of a defined class of individual units, each programmed to respond to a predetermined inquiry signal, from among a large population of individual units which are normally distributed throughout a defined facility comprising the steps of:

receiving at a central station a request to establish the present location of one of said individual units;

establishing a two-way communication channel between said central station and one or more of a plurality of spaced relay stations, each relay station including a transmitter and receiver and said relay stations being located so as to be cumulatively capable of substantially covering said facility with infrared energy;

selectively communicating by a coded message over said channel with said one or more of said plurality of relay stations;

causing said one or more relay stations to transit an inquiry signal by said infrared energy and enabling the receiver of said one or more relay stations for a predetermined time period following each such transmission;

receiving the inquiry signal at each of said individual units that is located within the coverage of said one or more relay stations;

transmitting a radiant energy acknowledgment signal from any individual unit which recognizes the inquiry signal received from a relay station to be a signal to which it is programmed to respond;

receiving said acknowledgment signal at any of said one or more relay stations within range of the radiant energy acknowledgment signal transmission;

transmitting to said central station over said channel from any relay station which receives said acknowledgment signal an identification signal which identifies that relay station;

upon said central station receiving an identification signal from a plurality of relay stations, determining the responding relay station closest to an individual unit by repeated further steps of modifying the coded message communicated over said channel by including within the message a command to lower the sensitivity of the relay station receiver and causing said plurality of relay stations to lower the sensitivity of their respective receivers; and utilizing at said central station the identification signal of the last relay station whose response is received after one or more reductions in sensitivity of the relay station receivers to determine the location of said last relay station and hence the approximate location of the individual unit which transmitted said acknowledgment signal.

8. The method of determining the present location of a member of a defined class of individual units from among a large population of individual units, each programmed to respond to a predetermined inquiry signal, which are normally distributed throughout a defined facility comprising the steps of:

receiving at a central station a request to establish the present location of one of said individual units;

establishing a two-way communication channel between said central station and one or more of a plurality of spaced relay stations, each relay station including a transmitter and a receiver and said relay stations being located so as to be cumulatively capable of substantially covering said facility with infrared energy;

selectively communicating by a coded message over said channel with said one or more of said plurality of relay stations;

causing said one or more relay stations to transmit an inquiry signal by said infrared energy and enabling the receiver of said one or more relay stations for a predetermined time period following each such transmission;

receiving the inquiry signal at each of said individual units that is located within the coverage of said one or more relay stations;

transmitting a radiant energy acknowledgment signal from any individual unit which recognizes the inquiry signal received from a relay station to be a signal to which it is programmed to respond;

receiving said acknowledgment signal at any of said one or more relay stations within range of the radiant energy acknowledgment signal transmission;

transmitting to said central station over said channel from any relay station which receives said acknowledgment signal an identification signal which identifies that relay station;

upon said central station receiving an identification signal from a plurality of relay stations, determining the responding relay station closest to an individual unit by repeated further steps of modifying the coded message communicated over said channel by including within the message a command to reduce the power of the relay station transmitter and causing said plurality of relay stations to reduce the power of their respective transmitters; and utilizing at said central station the identification signal of the last relay station whose response is received after one or more reductions of the relay stations transmitter power to determine the location of said last relay station and hence the approximate location of the individual unit which transmits said acknowledgment signal.

9. The method of claim 1 wherein said two-way communication channel is established over a power line.

10. The method of determing the present location of a member of a defined class of individual units the present location of which is not known from among a large population of individual units each programmed to respond to a predetermined inquiry signal which are normally distributed throughout a defined facility comprising the steps of:

receiving at a central station a request to establish the present location of one of said individual units;

establishing a two-way communication channel between said central station and at least one plurality of groups of spaced relay stations, each relay station including a transmitter and a receiver and said relay stations being located so as to be cumulatively capable of substantially covering said facility with radiant energy the detectable signal level from relay stations of different groups overlapping thereby substantially eliminating dead zones but wherein each relay station of a group covers an area which does not overlap with a detectable signal the areas covered by each of the other relay stations in the same group;

communicating by a coded message over said two-way communication channel with each of said groups of relay stations in sequence;

causing all of the relay stations of each said group in said sequence to transmit an inquiry signal by said radiant energy and enabling the receivers of the respective group relay stations for a predetermined time period following each such transmission;

receiving the inquiry signal at each of said individual units that is located within the coverage of any of the relay stations;

transmitting a radiant energy acknowledgment signal from any individual unit which recognizes the inquiry signal received from a relay station to be a signal to which it is programmed to respond;

receiving said acknowledgment signal at a receiver of any of said relay stations that is enabled and is within range of the radiant energy acknowledgment signal transmission;

transmitting to said central station over said channel from any relay station which receives said acknowledgment signal an identification signal which identifies that relay station; and utilizing at said central station a first identification signal received from a first group relay station to determine the location of said first group relay station and hence the approximate location of the individual unit which transmitted said acknowledgment signal; said utilizing including identifying the relay station of a second group if a second identification signal is received whereby said approximate location is determined to be within the overlap area covered by the responding first and second group relay stations.

11. The method of claim 10 wherein upon said central station receiving an identification signal from a plurality of relay stations, the method for determining the location of an individual unit is repeated adding the further steps of including within the coded message communicated over said channel a command to lower the sensitivity of the relay station receiver and causing said relay stations to lower the sensitivity of their respective receivers.

12. The method of claim 10 wherein upon said central station receiving an identification signal from a plurality of relay stations, the method for determining the location of an individual unit is repeated adding the further steps of including within the coded message communicated over said channel a command to reduce the power of the relay station transmitter and causing said relay stations to reduce the power of their respective transmitters.

13. The method of claim 10 wherein each of said groups of relay stations performs the step of transmitting an identification signal at a separate time period in said sequence.

14. A communication and locating system that operates within a defined facility comprising:

a plurality of individual transmitter-receiver units each of said units including means programmed to be responsive to a predetermined radiant energy inquiry signal and including means for transmitting a radiant energy acknowledgment signal in response to receiving said predetermined inquiry signal to which it is programmed to respond;

a plurality of groups of relay stations located so as to be cumulatively capable of substantially covering said facility with transmissions of radiant energy at detectable signal level for said units and in which each relay station of a group covers an area that is distinct from the areas covered by each of the other relay stations in the same group, each of said relay stations including means for transmitting the radiant energy inquiry signal to said individual units in response to coded meassages, said inquiry signals containing information indentifying a particular individual unit whose location is sought;

a central station including means for establishing a two-way communication channel between said central station and a plurality of said relay stations and for communicating by a coded meassage sequentially with said relay stations one group at a time over said channel, said coded message identifying the particular individual unit to be identified in the inquiry signal;

each of said relay stations including means operable after receiving said coded message for receiving an acknowledgment signal from said individual units and sending an indentification signal over said communication channel to said central station, said identification signal identifiying the sending relay station and indicating whether an acknowledgment signal was received by said sending relay station; and said central station further including means for receiving any identification signals from said relay stations and determining therefrom the approximate location of any particular individual unit responding to said coded message whereby a single response identifies said location as the area covered by the responding relay station and more than one response identifies said location as the overlap area covered by the responding relay stations.

15. The system of claim 14 wherein said radiant energy for transmitting said inquiry signal is infrared energy.

16. The system of claim 15 wherein said radiant energy acknowledgment signal comprises an ultrasonic acknowledgment signal.

17. The system of claim 16 wherein said ultrasonic acknowledgment signal is transmitted on a plurality of frequencies.

18. The system of claim 16 wherein each of said relay stations includes means for measuring the time that elapses between the transmission of an inquiry signal and the reception of an acknowledgment signal and means for including said time data within the indentification signal.

19. The system of claim 14 wherein said radiant energy acknowledgment signal and said radiant energy inquiry signal are both infrared signals.

20. The system of claim 14 wherein said central station includes means for coding said coded message to request that the particular individual unit identified in said message emit a sound and wherein said relay stations form said inquiry signal to request the emission of a sound in accordance with said coded message and wherein each of said individual units includes means for emitting a sound in response to receiving an inquiry signal, to which said respective unit is programmed to respond, which requests the emission of a sound.

21. A system according to claim 14 wherein said individual transmitter-receiver units normally operate in a low-current requirement condition operable to receive a wake-up signal to bring said units to full power operating condition and each of said relay stations initially transmitting said wake-up signal for each transmission to the said individual units.

22. The system of claim 14 wherein each of said groups of relay stations has a separate time period in which a relay station in that group can send an identification signal to said central station.

23. The system of claim 14 wherein said central station includes means, responsive to the reception of a plurality of identification signals, for commanding the responding said relay stations to lower the sensitivity of their respective receivers.

24. The system of claim 14 wherein said central station includes means, responsive to the reception of a plurality of identification signals, for commanding the responding said relay stations to reduce the power of their respective transmitters.

25. A communication and locating sytem comprising:
a control station;
a plurlaity of relay stations each covering an identified space within the area covered by said system; and
a badge station for each individual to be located by the system;
said control station comprising:
means for entering coded information identifying a person receiving an incoming call;
a non-active memory storing data identifying likely locations of the persons to be located by the system;
means responsive to entry of person-identifying data for searching said memory for the likely location of the person identified by said data entry;
means for communicating a transmission request to one or more of said relay stations selected to be in communication with the likely locations of the person identified; and
receiving means for receiving an identification signal from a relay station that has received an acknowledgment signal from a badge station, said identification signal identifying the location of the particular relay station that received the acknowledgment signal;
said relay stations each comprising;
means for receiving said transmission request from said control station;
means responsive to receiving said transmission request for radiating a coded inquiry signal into the particular identified space covered by said relay station;
means for receiving a radiated acknowledgment signal from a badge station within said identified space and developing a located response that indicates whether an acknowledgment signal was received; and
means for transmitting said located response in said identification signals to said receiving means in said control station;
said badge stations each comprising;
coded responsive radiation receiving means for detecting said coded inquiry signal individual to a particular badge from a local relay station; and
radiation transmitting means responsive to a detected coded inquiry signal for originating an acknowledgment radiating signal back to the local relay station;
said control station including:
means for identifying the number for placing a telephone call to a telephone set located near the location of the badge station which originated said acknowledgment signal; and
means operable upon failure to obtain an acknowledgment signal from the relay stations selected at the likely location of the person identified for repeating the transmission request in time sequence to selected relay stations until each said particular identified space has been radiated with said coded inquiry signal without simultaneous time and space overlap of signals in any said identified space to produce unambiguous response from the local relay stations nearest said badge station originating an acknowledgment signal.

26. A system according to claim 25 wherein said radiated signals are infrared energy.

27. A system according to claim 26 wherein communication between said control station and said relay stations is by carrier current via wire circuits.

28. A system according to claim 25 wherein said radiated signal from said relay station is infrared energy and said radiation from said badge station is ultrasonic energy.

29. A system according to claim 28 wherein said relay station includes means for detecting the range to a responding badge station.

30. Apparatus according to claim 25 wherein said badge station is battery powered and includes means normally operating said badge station in quiescent low current condition and means responsive to a wake-up signal from one or more of said relay stations for powering said badge station to full power operation.

31. A communication and locating system comprising:
 a control station;
 a plurality of relay stations each covering an identified space within the area covered by said system; and
 a badge station for each individual to be located by the system;
 said control station comprising:
  means for entering coded information identifying a person receiving an incoming call;
  a memory storing data identifying likely locations of the persons to be located by the system;
  means responsive to entry of person-identifying data for searching said memory for the likely location of the person identified by said data entry;
  means for communicating a transmission request to one or more of said relay stations selected to be in communication with the like locations of the person identified; and
  receiving means for receiving an identification signal from a relay station that has received an acknowledgment signal from a badge station, said identification signal identifying the location of the particular relay station that received the acknowledgment signal;
 said relay stations each comprising;
  means for receiving said transmission request from said control station;
  means responsive to receiving said transmission request to radiate a coded inquiry signal into the particular identified space covered by said relay station;
  means for receiving a radiated acknowledgment signal from a badge station within said identified space and developing a located respnse that indicates whether an acknowledgment signal was received; and
  means for transmitting said located response in said identification signals to said receiving means in said control station;
 said badge stations each comprising;
  coded responsive radiation receiving means for detecting said coded inquiry signal individual to a particular badge, from a local relay station; and
  radiation transmitting means responsive to a detected coded inquiry signal for originating an acknowledgment radiating signal back to the local relay station;
 said control station including;
  means for identifying the number for placing a telephone call to a telephone set located near the location of the badge station which originated said acknowledgment signal; and
  means, operable upon failure to obtain an acknowledgment signal from the relay stations selected at the likely location of the person identified, for repeating the transmission request in time sequence to all relay stations, wherein said identified spaces covered by said system include spaces having a plurality of relay stations with partially overlapping coverage and said control station includes means responsive to multiple response from the same badge station via plural different location relay stations for reducing the signal detection sensitivity of said plural relay stations to select the relay station receiving the strongest badge originated signal.

32. Apparatus according to claim 29 wherein said control station is responsive to plural range data from plural relay stations originating from the same badge station for determining the location of said badge station relative to said plural relay stations.

33. The method of determining the present location of a member of a defined class of individual units the present location of which is not known from among a large population of individual units, each programmed to respond to a predetermined inquiry signal, which are normally distributed throughout a defined facility comprising the steps of:
 receiving at a central station a request to establish the present location of one of said individual units;
 establishing a two-way communication channel between said central station and a plurality of spaced relay stations, each relay station including a transmitter and a receiver and said relay stations being located so as to be cumulatively capable of substantially covering said facility with infrared energy;
 communicating by a message coded for selecting said one individual unit over said channel with said plurality of relay stations;
 causing said relay stations to transmit an inquiry signal by said infrared energy and enabling the receiver of said relay stations for a predetermined time period following each such transmission;
 receiving the inquiry signal at each of said individual units that is located within the coverage of said one or more relay stations;
 transmitting a radiant energy acknowledgment signal from any individual unit which recognizes the inquiry signal received from a relay station to be the coded message to which it is programmed to responde;
 receiving said acknowledgment signal at any of said relay stations within range of the radiant energy acknowledgment signal transmission;
 transmitting to said central station over said channel from any relay station which receives said acknowledgment signal an identification signal which identifies that relay station; and
 utilizing at said central station any identification signal received from a relay station to determine the location of said relay station and hence the approximate location of the individual unit which transmitted said acknowledgment signal, said utilizing including repeating, if more than one identification signal is received, transmission of said inquiry signal by any relay stations which respond with an identification signal and reducing the sensitivity of the radiant energy receivers of said any relay stations to identify the relay station responsive to the lowest signal level.

* * * * *